US012024782B2

(12) United States Patent
Licht

(10) Patent No.: US 12,024,782 B2
(45) Date of Patent: Jul. 2, 2024

(54) PROCESS FOR THE FACILE ELECTROSYNTHESIS OF GRAPHENE FROM $CO_2$

(71) Applicant: C2CNT LLC, Venice, FL (US)

(72) Inventor: Stuart Licht, Venice, FL (US)

(73) Assignee: C2CNT LLC, Venice, FL (US)

( * ) Notice: Subject to any disclaimer, the term of this patent is extended or adjusted under 35 U.S.C. 154(b) by 0 days.

(21) Appl. No.: 18/354,435

(22) Filed: Jul. 18, 2023

(65) Prior Publication Data

US 2023/0366104 A1 Nov. 16, 2023

Related U.S. Application Data

(62) Division of application No. 16/886,409, filed on May 28, 2020.

(Continued)

(51) Int. Cl.
*C25B 1/135* (2021.01)
*C25B 1/00* (2021.01)
(Continued)

(52) U.S. Cl.
CPC ............. *C25B 1/00* (2013.01); *C25B 1/135* (2021.01); *C25B 9/17* (2021.01); *C25B 11/051* (2021.01); *C25B 11/057* (2021.01); *C25B 11/075* (2021.01)

(58) Field of Classification Search
None
See application file for complete search history.

(56) References Cited

U.S. PATENT DOCUMENTS 9,683,297 B2 6/2017 Licht
9,758,881 B2 9/2017 Licht
(Continued)

FOREIGN PATENT DOCUMENTS

WO WO-2016138469 A1 9/2016
WO WO2018031591 A1 2/2018
(Continued)

OTHER PUBLICATIONS

Allahyarzadeh, et al., Electrodeposition On Superalloy Substrates: A Review, Surface Review and Letters, Feb. 29, 2016, 23:03:Abstract.
(Continued)

*Primary Examiner* — Wojciech Haske
(74) *Attorney, Agent, or Firm* — Blank Rome LLP

(57) ABSTRACT

The present invention relates to the production of graphene from $CO_2$ through electrolysis and exfoliation processes. One embodiment is a method for producing graphene comprising (i) performing electrolysis between an electrolysis anode and an electrolysis cathode in a molten carbonate electrolyte to generate carbon nanomaterial on the cathode, and (ii) electrochemically exfoliating the carbon nanomaterial from a second anode to produce graphene. The exfoliating step produces graphene in high yield than thicker, conventional graphite exfoliation reactions. $CO_2$ can be the sole reactant used to produce the valuable product as graphene. This can incentivize utilization of $CO_2$, and unlike alternative products made from $CO_2$ such as carbon monoxide or other fuels such as methane, use of the graphene product does not release this greenhouse gas back into the atmosphere.

19 Claims, 12 Drawing Sheets

Related U.S. Application Data

(60) Provisional application No. 62/938,135, filed on Nov. 20, 2019, provisional application No. 62/890,719, filed on Aug. 23, 2019, provisional application No. 62/853,473, filed on May 28, 2019.

(51) Int. Cl.
    *C25B 9/17*    (2021.01)
    *C25B 11/051*    (2021.01)
    *C25B 11/057*    (2021.01)
    *C25B 11/075*    (2021.01)

(56) References Cited

U.S. PATENT DOCUMENTS

| | | |
|---|---|---|
| 2014/0202874 A1 | 7/2014 | Elgammal et al. |
| 2016/0168726 A1 | 6/2016 | Dryfe et al. |
| 2017/0260637 A1 | 9/2017 | Zhamu |
| 2018/0044183 A1 | 2/2018 | Licht |

FOREIGN PATENT DOCUMENTS

| | | |
|---|---|---|
| WO | WO-2018093942 A1 | 5/2018 |
| WO | WO-2018156642 A1 | 8/2018 |
| WO | WO2020092449 A1 | 5/2020 |

OTHER PUBLICATIONS

Bakunin, et al., Modern Methods for Synthesis of Few-Layer Graphene Structures by Electrochemical Exfoliation of Graphite, Springer Link, Mar. 2019, 10:2:249-255.

Chang, et al., A New Lower Limit for the Ultimate Breaking Strain of Carbon Nanotubes, ACS Nano, 2010, 4:9, 5 pages.

Coros, et al,. A Brief Overview on Synthesis and Applications of Graphene and Graphene-based Nonomaterials, Front Matter Sci, 2019, 13:1-23-32.

Dey, et al., How Does an Amalgamated Ni Cathode Affect Carbon Nanotube Growth? A Density Functional Theory Study, RSC Adv., 2016, 6:27191_27196.

Hashimoto, et al., Supplementary Information: Bipolar Anodic Electrochemical Exfoliation of Graphite Powders, Electrochemistry Communication, 2019, 104:106-475.

Johnson, et al., Carbon Nanotube Wools Made Directly From $CO_2$ by Molten Electrolysis: Value Driven Pathways to Carbon Dioxide Greenhouse Gas Mitigation, Materials Today Energy, 2017, 5:230-236.

Johnson, et al., Data on SEM, TEM and Raman Spectra of Doped, and Wool Carbon Nanotubes Made Directly From $CO_2$ by Molten Electrolysis, Data in Brief, 2017, 14:592-606.

Kamegaya, et la., Improved Durability of Iridium Oxide Coated Titanium Anode with Interlayers for Oxygen Evolution at High Current Densities, ScienceDirect, Electrochimica Acta, May 1995, 40:7:Abstract.

Lau, et al., Thermodynamic assessment of $CO_2$ to carbon nanofiber transformation for carbon sequestration in a combined cycle gas or a coal power plant, Energy Conversion and Management, 2016, 122:400-410.

Licht, Co-production of Cement and Carbon Nanotubes with a Carbon Negative Footprint, Journal of $CO_2$ Utilization, 2017, 18-378-389.

Licht, et al., A New Solar Carbon Capture Process: Solar Thermal Electrochemical Photo (STEP) Carbon Capture, The Journal of Physical Chemistry, Letters, J. Phys. Chem. Lett., 2010, 1:2363-2368.

Licht, et al., Amplified $CO_2$ Reduction of Greenhouse Gas Emissions with C2CNT Carbon Nanotube Composites, Materials Today Sustainability, 2019, 6:2589-2347. 24 pages.

Licht, et al., Carbon Nanotubes Produced from Ambient Carbon Dioxide for Environmentally Sustainable Lithium-Ion and Sodium-Ion Battery Anodes, ACS Central Science, Mar. 2, 2016, 2:162-168.

Licht, et al., High Solubility Pathway for the Carbon Dioxide Free Production of Iron, Chem Commun, 2010, 46:7004-7006.

Licht, et al., STEP (Solar Thermal Electrochemical Photo) Generation of Energetic Molecules: A Solar Chemical Process to End Anthropogenic Global Warming, J. Phys. Chem. C, 2009, 113:16283-16292.

Liu, et al., Carbon Nano-Onions Made Directly from $CO_2$ by Molten Electrolysis for Greenhouse Gas Mitigation, Advanced Sustainable Systems, 2019, 10 pages.

Lopez, et al., Study of Iridium Electrodeposition on Ti and A304, Int. J. Electrochem. Sci., 2015, 10:9933-9942.

Mansour, et al., A Significant Improvement of Both Yield and Purity During SWCNT Synthesis via the Electric Arc Process, ScienceDirect, 2007, 45:8:Abstract.

Price and Market of Materials, Carbon XPrize Standards Data Summary Set, Draft V1.2, (Sep. 12, 2017)).

Ren, et al., One-Pot Synthesis of Carbon Nanofibers from $CO_2$, Nano Letters, 2015, 15:6142-6148.

Ren, et al., Tracking Airborne $CO_2$ Mitigation and Low Cost Transformation Into Valuable Carbon Nanotubes, Scientific Reports, Jun. 9, 2016, 6:27760, 11 pages.

Ren, et al., Transformation of the Greenhouse Gas $CO_2$ by Molten Electrolysis Into A Wide Controlled Selection of Carbon Nanotubes, Journal of $CO_2$ Utilization, 2017, 18:335-344.

Valles, et al., Solutions of Negatively Charged Graphene Sheets and Ribbons, J. Am. Chem. Soc., 2008, 130:15802-15804.

Wang, et al., Exploration of Alkali Cation Variation on the Synthesis of Carbon Nanotubes by Electrolysis of $CO_2$ in Molten Carbonates, Journal of $CO_2$ Utilization, 2019, 34:303-312.

Wang, et al., Preparation of Graphene Sheets by Electrochemical Exfoliation of Graphite in Confined Space and Their Application in Transparent Conductive Films, ACS Appl Mater Interface, 2017, 9:34456-34466.

Wu, et al., One-pot synthesis of nanostructured carbon materials from carbon dioxide via electrolysis in molten carbonate salts, Carbon, 2016, 106:208-217.

Xia, et al., A Robust, Modular Approach to Produce Graphene-MOx Multilayer Foams as Electrodes for Li-ion Batteries, Nanoscale, 2019, 11:5265-5273.

Yu, et al., Strength and Breaking Mechanism of Multiwalled Carbon Nanotubes Under Tensile Load, Science, 2000, 287:28:637-640.

Agudosi, et al., A Review of the Graphene Synthesis Routes and its Applications in Electrochemical Energy Storage, Critical Reviews In Solid State And Materials Sciences, 2019, 40 pages.

Azam, et al., Review-Critical Considerations of High Quality Graphene Synthesized by Plasma-Enhanced Chemical Vapor Deposition for Electronic and Energy Storage Devices, ECS Journal of Solid State Science and Technology, 2017, 6:6:M3035-M3048.

Bai, et al., Graphene for Energy Storage and Conversion: Synthesis and Interdisciplinary Applications, Electrochemical Energy Reviews, 2019, 36 pages.

Berger, et al., Ultrathin Epitaxial Graphite: 2D Electron Gas Properties and a Route toward Graphene-based Nanoelectronics, J. Phys. Chem. B, 2004, 108:19912-19916.

Buqa, et al., The influence of graphite surface modification on the exfoliation during electrochemical lithium insertion, ETDEWEB (/etdeweb), 2003, 3 pages.

Del Rio-Castillo, et al., Selective Suspension of Single Layer Graphene Mechano-chemically Exfoliated From Carbon Nanofibers, Nano Research, 2014, 7:7:963-972.

Khakpour, et al, Bipolar Exfoliation and in Situ Deposition of High-Quality Graphene for Supercapacitor Application, ACS Appl Energy Matter, 2019, 2:4813-4820.

Khanna, et al., Carbon Nanofiber Production Life Cycle Energy Consumption and Enviornomental Impact, Journal of Industrial Ecology, 2008, 12:3:394-410.

Lee, et al., Review of the Synthesis, Transfer, Characterization and Growth Mechanisms of Single and Multilayer Graphene, RSC Advances, 2017, 7:15644-15693.

Li, et al., Preparation of Single- and Few-Layer Graphene Sheets Using Co Deposition on SiC Substrate, Journal of Nanomaterials, 2011, 7 pages.

(56) References Cited

OTHER PUBLICATIONS

Pénicaud, et al., Mild Dissolution of Carbon Nanotubes: Composite Carbon Nanotube Fibres from Polyelectrolyte Solutions, 2007, 67:5:795-797 (Abstract).

Spahr, et al., Exfoliation of Graphite during Electrochemical Lithium Insertion in Ethylene Carbonate-Containing Electrolytes, Journal of The Electrochemical Society, 2014, 151:9:A1383-A1395.

Tanaka, et al., Method for Controlling Electrical Properties of Single-Layer Graphene Nanoribbons via Adsorbed Planar Molecular Nanoparticles, Scientific Report, 2015, 5:12341, 10 pages.

Zhang, et al., The Way Towards Ultrafast Growth of Single-Crystal Graphene on Copper, Advanced Science, 2017, 4:1700087, 8 pages.

Shukla, et al., Synthesis and Patterning of Graphene: Strategies and Prospects, Applied Physics Reviews, 2019, 6:2:Abstract.

Singh, et al., Improved Chemical Synthesis of Graphene Using a Safer Solvothermal Route, International Journal of Nanoscience, 2011, 10:1&2:39-42.

Alanyalioglu, Murat, et al., "The synthesis of graphene sheets with controlled thickness and order using surfactant-assisted electrochemical processes", Carbon 50, 2012, 142-152.

Yu, Li, et al., "The synthesis of graphene sheets with controlled thickness and order using surfactant-assisted electrochemical processes", Trans. Mat. Res. Soc. Japan, 2012, 37[2]209-212.

Parvez et al. (J. Am. Chem. Soc. 2014, 136, 6083-6091). (Year: 2014).

International Search Report and Written Opinion for PCT/US2020/034945 (Dec. 3, 2020).

PROCESS FOR THE FACILE ELECTROSYNTHESIS OF GRAPHENE FROM CO$_2$

CROSS-REFERENCE TO RELATED APPLICATIONS

This application is a divisional of U.S. patent application Ser. No. 16/886,409, filed May 28, 2020, which claims the benefit of U.S. Provisional Nos. 62/938,135, filed on Nov. 20, 2019, 62/890,719, filed on Aug. 23, 2019, and 62/853,473, filed on May 28, 2019, the entire contents of each of which are incorporated herein by reference.

FIELD OF THE INVENTION

The present invention relates to the production of graphene from CO$_2$ through electrolysis and exfoliation processes. The exfoliating step produces graphene in high yield than thicker, conventional graphite exfoliation reactions. CO$_2$ can be the sole reactant used to produce the valuable product as graphene. This can incentivize utilization of CO$_2$, and unlike alternative products made from CO$_2$ such as carbon monoxide or other fuels such as methane, use of the graphene product does not release this greenhouse gas back into the atmosphere.

BACKGROUND OF THE INVENTION

Graphene has unique properties that are useful for a variety of applications. However, the synthetic costs and the challenge to isolate the graphene product in its native two dimensional structure lead to the high current cost of graphene, valued at approximately $1 million per ton. See Price and Market of Materials, Carbon XPrize Standards Data Summary Set, Draft V1.2, (Sep. 12, 2017)).

Graphene has a high surface area, high thermal and electrical conductivity, strength, surface tailorability, and high charge carrier conductivity that makes it uniquely suitable for energy storage and electronics. See, e.g., Coroşet al., *Front. Mat. Sci.,* 2019, 13, 23; Agudosi et al., *Crit. Rev. Mat. Sci.,* 2019, 1040-8436, 1; Bai et al., *Electrochem. Energy Rev.,* 2019, doi.org/10.1007/s41918-019-00042-6; and Zhang et al., *Adv. Sci.,* 2017, 1700087, 4.

The ability of graphene to carry plasmons allows it to strongly interact with light in a non-linear fashion and act both as a transducer and transmitter in optoelectronics. Graphene's 2D honey-comb lattice sp$^2$ crystal structure possess extremely high intrinsic charge mobility (250,000 cm$^2$/Vs), a high specific surface area (2630 m$^2$/g), high thermal conductivity (5000 W/mK), high Young's modulus (1.0 TPa), and high optical transmittance (97.7%).

Methods to produce graphene include thermal annealing (see, e.g., Li et al., *J. Nanomat.,* 2011, 2011, 319624), unzipping nanotubes (see, e.g., Tanaka et al., *Sci. Rep.,* 2015, 5, 12341), solvothermal and thermal decomposition (see, e.g., Singh et al., *Int. J. Nanosci.,* 10, 39; Berger et al., *J. Phys. Chem. B,* 2004, 108, 19912), ball-milling and chemical exfoliation (see, e.g., Del Tio-Castillo et al., *Nano Res.,* 2014, 7, 963; Liu et al., *Chem. Eng. J.,* 2019, 355, 181), and chemical vapor deposition (CVD) (see, e.g. Shukla et al., *Appl. Phys. Rev.,* 2019, 6, 021331; Azam et al., *ECS J Solid State Science Technology,* 2017 6(6) M3035; Lee et al., *RSC Adv,* 2017, 7, 15644; and Zhang et al., Adv. Sci., 2017, 1700087, 4).

Chemical vapor deposition (CVD) is a popular method to produce graphene from a variety of organometallics or other carbon sources using transition metal catalysts. However, conventional CVD can have a massive carbon footprint of over 600 tonnes of CO$_2$ per tonne of nano-carbon produced (see, e.g. Khanna et al., *J. Ind. Ecology,* 2008, 12, 394).

In a 2003 paper investigating processes detrimental to Li-ion battery anodes, it was noted that electrochemical alkali ion intercalation could lead to peeling off of layers from a graphite anode (see, e.g., Buqa et al., *US DOE Tech Rep,* ETDE-CH-0301, 2003, 63; also see Spahr et al., *J. Electrochem. Soc.,* 151, 2004, 181).

In 2007, the observation of one-atom thick graphene layers by electrochemical exfoliation was observed (see, e.g., Penicaud et al., *Compos. Sci. Technol.,* 67, 2007, 795; Mansour et al., *Carbon,* 45, 2007, 1651; and Valles et al., *J. Am. Chem. Soc.,* 130, 2008, 15802).

Electrochemical exfoliated graphene prepared from graphite is of increasing interest today, and is often mechanistically interpreted as an anodic process in which intercalated ions between the graphite layers are oxidized, forming gases which break the weak interlayer Van der Waals bonds, and release thin single or multi-layered graphene sheets into the electrolyte (see, e.g., Hashimoto et al., *Electrochem. Comm.,* 104, 2019, 106475; Xia et al., *Nanoscale,* 11, 2019, 5265; Bakunin et al., *Inorg. Mal.: Appl. Res.,* 10, 2019, 249; and Khahpour et al., *Appl. Energy Mat.,* 2, 2019, 4813). In 2017, it was observed that compression of graphite flakes prior to exfoliation, such as using graphite powder confined by wax coating could increase the yield of graphene (see, e.g., Wang et al., *Appl. Mat. Interfaces,* 9, 2017, 34456).

A low carbon footprint carbon nanomaterial may be produced from a molten carbonate by electrolysis, at low cost and using CO$_2$ as a reactant, for example as a C2CNT (CO$_2$ to Carbon Nanotube) synthesis. However, technical challenges have prevented scale-up of the process and the nanomaterial remains scarce. While examples of carbon nanotubes (CNTs) prepared by C2CNT synthesis have been termed "straight," each example of synthesized, grouped, CNTs shown was visibly entangled, and twisted or hooked, although less twisted than CNTs denoted "tangled". Entangled and twisted CNTs tend to agglomerate and are it is difficult therefore to disperse them homogeneously in a composite. In the C2CNT synthesized examples "straight" referred specifically to CNTs containing less sp$^3$ bonding amongst carbons defects, and "tangled" CNTs contain more sp$^3$ defects. Example processes for producing carbon nanomaterials from molten carbonates by electrolysis are disclosed in, for example, Licht et al., *J. CO$_2$ Utilization,* 2017, vol. 18, 335-344; *Nano Lett.,* 2015, vol. 15, 6142-6148; *Materials Today Energy,* 2017, 230-236; *Data in Brief,* 2017, vol. 14, 592-606; *Scientific Reports, Nature,* 2016, vol. 6, 1-10; *ACS Cent. Sci.,* 2015, vol. 2, 162-168; *RSC Adv.,* 2016, vol. 6, 27191-27196; *Carbon,* 2016, vol. 106, 208-217; *Energy Convers. Manag.,* 2016, vol. 122, 400-410; *J. CO$_2$ Utilization,* 2017, vol. 18, 378-389; *J. CO$_2$ Utilization,* 2017, vol. 18, 335-344; *J. Phys. Chem. Lett.,.* 2010, vol. 1, 2363-2368; *J. Phys. Chem. C,* 2009, vol. 113, 16283-16292; *J. CO$_2$ Utilization,* 2019, vol. 34, 303-312; *Adv. Sustainable Syst.,* 2019, vol. 3, 1900056; and *Mater. Today Sustainability,* 2019, vol. 6, 100023; U.S. Pat. Nos. 9,758,881 and 9,683,297, U.S. Publication No. 2019/36040, and International Publication Nos. WO 16/138469, WO 18/093942, and WO 18/156642.

There remains, however, a need for a convenient and facile low cost, low carbon footprint synthesis of graphene.

SUMMARY OF THE INVENTION

The present invention describes a novel facile electrosynthesis of graphene at low cost from CO$_2$. The process involves (i) performing electrolysis between an electrolysis anode and an electrolysis cathode in a molten carbonate electrolyte to generate carbon nanomaterial on the cathode; and (ii) electrochemically exfoliating the carbon nanomaterial from a second anode to produce graphene.

The electro-synthesized carbon platelets are nano-thin, promoting higher graphene yields than observed using thicker, conventional graphite exfoliation processes. $CO_2$ can be the sole reactant used to produce the graphene product. Utilization of $CO_2$ as the sole reactant produces graphene as a low carbon footprint product. This incentivizes utilization and consumption of $CO_2$ and, unlike alternative products made from $CO_2$ such as carbon monoxide or other fuels such as methane, use of the graphene product does not require combustion and does not release this greenhouse gas back into the atmosphere. The cost of the electrochemical processes described herein is low and carbon dioxide is consumed in the formation of the graphene. Prior to the work described herein, it was considered that graphene could only be mass produced with a high carbon footprint and at high cost. $CO_2$ electrolysis in molten carbonate production of carbon platelets readily scales upward linearly with the area of the electrolysis electrodes, facilitating larger scale synthesis of graphene.

The graphene produced by the processes described herein typically exhibits a relatively small lateral dimension (on the order of about 2 to 8 µm). This lateral size is beneficial, for example, for the use of graphene as a lubricant, in battery anodes, and in graphene admixture applications. Larger lateral dimensions, however, may be expected with further variations in the electrochemical growth parameters, including, for example, electrolysis duration, current density, temperature, electrode and electrolyte composition, and would expand the utility of the molten carbonate electrolysis processes described herein.

Electrosynthesized carbon platelets and other non-CNT graphene layered morphologies (such as carbon nano-onions) comprising nano graphene layers in unique arrangements may be synthesized by the processes described herein. The inventor has discovered the molten carbonate electrosynthesis of two classes of carbon nano-products. A first class is formed when a transition metal nucleating agent is included in the electrolysis and produces carbon nanotubes and carbon nanofibers. In the present invention, a second class is formed when transition metal nucleating agents are suppressed or excluded from the electrolysis, yielding unique nano structures including, for example, nano-platelets, nano-onions and nano-scaffolds. Each of the nanostructures described herein contains layered graphene and may be exfoliated to form graphene plates.

Without being bound to any particular theory, the present inventor theorizes that carbon nanotubes are thermodynamically more stable and grow more readily than other graphene layered nanomaterial products. One ramification of this stability is that CNTs display the highest material strength of any material measured to date. See e.g., Yu, et al., *Science*, 287 (2000) 637-640 and Chang et al., *ACS Nano* 4 (2010) 5095-5100. Hence, CNTs provide a low energy route to a specific carbon nanomaterial product.

Nanotube growth in molten carbonate is electrocatalytically facilitated by transition metal nucleation. When the nucleation is disrupted by, for example, suppression, exclusion and/or inhibition, alternative carbon nano morphologies are observed to occur. In order to support the dominant growth of unique graphene layered carbon nano-nano-scaffolds, an experimental set of conditions have been identified that discourage the transition metal nucleation route. For example, several electrolysis conditions are described herein that reliably and consistently inhibit CNT nucleation and promote growth of other graphene layered based carbon nano-materials, even in the presence of the transition metal nucleation agents, such as Ni, Cr and Fe.

The first is the direct cathodic deposition exclusion of transition metals that can be in the electrolysis system (e.g., the deposition of transition metals onto the cathode is inhibited, suppressed or prevented). For example, this can be achieved by selecting electrolytic conditions which suppress the solubility of transition metal nucleating agents in the electrolyte. The lowered solubility minimizes their concentration in the electrolyte or near the cathode surface to inhibit their diffusion and inhibit the development of nucleation seeds required for CNT growth. Examples of these physical chemical conditions include, for example, (i) the use of nucleating metals, such as iron, in binary carbonates (i.e., a mixture of carbonates such as lithium carbonate in combination with potassium and/or sodium carbonate, instead of pure lithium carbonate) in which the nucleating metals are less soluble, and (ii) metal cation concentrations which are in equilibria balance with oxides; an increase in one, diminishes the solubility of the other, and therefore addition of oxide to the carbonate electrolyte will diminish the solubility and availability of the transition metal nucleating agents.

Other physical chemical conditions to favor layered graphene morphologies over CNTs include: (i) a decrease in the electrolysis temperature, (ii) a decrease in the concentration of lithium in the molten carbonate electrolyte replaced by an increase in larger than lithium species, and with decreased lithium concentration even at higher temperatures, and (iii) conditions of higher electrolysis current density. Consistent with these observations are the mechanistic implications inhibiting nucleation that a decrease in temperature will decrease the rate of carbonate mass transport to a point source for nucleation, which will have a greater inhibiting effect than a wide area diffusion to a growing nano carbon structure (i.e., less material is provided for reduction and carbon growth). A larger cation than lithium will face a larger energy barrier when attempting to permeate the nucleation site and growing CNT walls to provide needed charge compensation during the ongoing growth process. Similarly, the greater mass transport required at higher current density will favor the two-dimensional diffusion consistent with the scaffold's largely planar growth, rather than the point source diffusion consistent with a nucleation point growth process. Each of these techniques can be used alone or in any combination to inhibit, suppress, or prevent transition metal nucleation.

According, in one aspect, the present invention relates to a method for producing a graphene carbon nanomaterial. In one embodiment, the method comprises:
  (i) performing electrolysis between an electrolysis anode and an electrolysis cathode in a molten carbonate electrolyte to generate carbon nanomaterial on the cathode; and
  (ii) electrochemically exfoliating the carbon nanomaterial (for example, from a second anode) to produce graphene.

In one embodiment of any of the methods described herein, step (i) is performed without a transition metal on or adjacent to the surface of the cathode.

In one embodiment of any of the methods described herein, the electrolysis anode and molten carbonate electrolyte in step (i) do not include a transition metal. In another embodiment of any of the methods described herein, the electrolysis anode, electrolysis cathode, and molten carbonate electrolyte in step (i) do not include a transition metal that is molten above the electrolyte melting point, such as zinc, tin, lead, cadmium, mercury or aluminium.

In another embodiment, the electrolysis is performed in the absence of an oxide, such as an alkali metal oxide (e.g., lithium oxide).

In one embodiment of any of the methods described herein, the electrolysis in step (i) is performed in the absence of a transition metal. In one embodiment of any of the methods described herein, the electrolysis in step (i) is performed in the absence of a transition metal other than zinc.

In one embodiment of any of the methods described herein, step (i) comprises
 (a) heating a carbonate electrolyte to obtain a molten carbonate electrolyte;
 (b) disposing the molten carbonate electrolyte between an electrolysis anode and an electrolysis cathode in a cell; and
 (c) applying an electrical current to the electrolysis cathode and the electrolysis anode in the cell to electrolyze the carbonate and generate carbon nanomaterial (e.g., carbon nanoplatelets) on the electrolysis cathode.

In one embodiment of any of the methods described herein, step (ii) comprises performing electrolysis where the electrolysis cathode from step (i) having the carbon nanomaterial is used as an anode to produce graphene.

In one embodiment of any of the methods described herein, the electrolysis cathode having the carbon nanomaterial is cooled prior to performing the exfoliation.

In one embodiment of any of the methods described herein, step (ii) comprises (a) placing the cathode having carbon nanomaterial from step (i) from the electrolysis cathode as an exfoliation anode in an electrochemical cell containing an exfoliation cathode and an exfoliation electrolyte, (b) applying an electrical voltage between the exfoliation anode and the exfoliation cathode to exfoliate graphene from the exfoliation anode, and (c) optionally, collecting graphene exfoliated from the exfoliation anode.

In one embodiment of any of the methods described herein, the electrolyzed carbonate in step (i) is replenished by addition of carbon dioxide.

In one embodiment of any of the methods described herein, the source of the added carbon dioxide is one of air, pressurized $CO_2$, concentrated $CO_2$, a power generating industrial process, an iron generating industrial process, a steel generating industrial process, a cement formation process, an ammonia formation industrial process, an aluminum formation industrial process, a manufacturing process, an oven, a smokestack, or an internal combustionengines.

In one embodiment of any of the methods and systems described herein, the electrolysis cathode comprises stainless steel, cast iron, a nickel alloy such as, but not limited to, C276 (UNS N10276—a nickel-molybdenum-chromium alloy containing tungsten), Inconel® (nickel-chromium based superalloys) (available from Special Metals Co. of New Hartford, NY, USA) or Nichrome (nickel-chrome alloy), or a material that resists corrosion in the presence of the molten carbonate electrolyte, such as, for example, alumina ceramic, or any combination of the foregoing.

In one embodiment of any of the methods and systems described herein, the electrolysis anode comprises iridium, platinum, a material that is electrocatalytically active towards carbonate oxidation while resisting corrosion in the presence of the molten carbonate electrolyte, or any combination of the foregoing.

In one embodiment of any of the methods described herein, the electrolysis cathode is coated with zinc, e.g., stainless steel coated with zinc.

In one embodiment of any of the methods described herein, in step (i), electrical current is applied with stepwise increases, or any other manner of gradual current increases. For example, in certain embodiments of any of the methods described herein, the electrolysis current is applied for about 3 to about 30 minutes first at, for example, about 0.01, then at about 0.02, then at about 0.04, then at about 0.08 $A/cm^2$, followed by a longer duration, higher constant current density, such as, e.g., about 0.1, about 0.2 or about 0.5 $A/cm^2$.

In another embodiment of any of the methods described herein, the carbon nanomaterial growth comprises carbon nanoplatelets.

In another embodiment of any of the methods described herein, the carbon nanoplatelets comprise less than about 125 graphene layers, such as less than about 100 graphene layers, less than about 75 graphene layers, less than about 50 graphene layers, less than about 25 graphene layers, less than about 10 graphene layers or less than about 5 graphene layers.

In another embodiment of any of the methods described herein, the carbonate electrolyte comprises an alkali metal carbonate, an alkali earth metal carbonate, or any combination thereof.

In another embodiment of any of the methods described herein, the alkali metal carbonate or alkali earth metal carbonate is lithium carbonate, sodium carbonate, potassium carbonate, rubidium carbonate, cesium carbonate, francium carbonate, beryllium carbonate, magnesium carbonate, calcium carbonate, strontium carbonate, barium carbonate, radium carbonate, or any mixture thereof.

In one embodiment of any of the methods described herein, the molten carbonate electrolyte comprises lithium carbonate. In another embodiment of any of the steps for producing nano-materials, such as nano-platelets, described herein, the molten carbonate electrolyte comprises at least about 70, 80, 90, 95, 98, 99, or 100% of lithium carbonate, based upon 100% total weight of carbonate salts in the electrolyte.

In another embodiment of any of the methods described herein, the molten carbonate electrolyte further comprises one or more oxides, and/or one or more oxygen, sulfur, halide, nitrogen or phosphorous containing inorganic salts.

In another embodiment of any of the methods described herein, step (ii) is performed in the presence of an exfoliation electrolyte, and the exfoliation electrolyte comprises an aqueous solution.

In another embodiment of any of the methods described herein, the exfoliation electrolyte comprises an aqueous solution of ammonium sulfate.

In another embodiment of any of the methods described herein, the exfoliation electrolyte comprises a nonaqueous solution, such as for example, a chlorinated hydrocarbon, such as, e.g., chloroform, or an alcohol, such as, e.g., isopropanol, or any combination thereof.

In another embodiment of any of the methods described herein, the exfoliation electrolyte further comprises a carbonate dissolving solution.

In another embodiment of any of the methods described herein, the exfoliation is performed by electrolysis between an exfoliation anode and the exfoliation cathode in an exfoliation electrolyte, where the exfoliation anode and the exfoliation cathode are separated by a membrane, filter, diaphragm or porous separator to isolate the graphene produced within the vicinity of the anode.

In another embodiment of any of the methods described herein, the graphene produced comprises less than 10 graphene layers, such as less than 5 graphene layers. In another embodiment of any of the methods described herein, the graphene produced comprises a single layer of graphene.

In another embodiment of any of the methods described herein, the coulombic efficiency of the process described in step (i) of any embodiment herein is greater than about 80%, such as greater than about 85%, greater than about 90%, or greater than about 95%. In another embodiment of any of the methods described herein, the coulombic efficiency of the process described in step (i) of any embodiment herein is about 100%.

In another embodiment of any of the methods described herein, the electrolysis reaction described in step (i) of an embodiment herein is performed at a current density of between about 5 and about 5000 mA cm$^2$, such as between about 50 and about 1000 mA cm$^2$, or between about 100 and about 600 mA cm$^2$.

In another embodiment of any of the methods described herein, the graphene carbon nanomaterial has a purity greater than about 80%, such as greater than about 85%, greater than about 90%, greater than about 95%, greater than about 97.5% or greater than about 99%.

In another embodiment of any of the methods described herein, the graphene carbon nanomaterial exhibits a 2D peak in the Raman spectrum at less than 2720 cm$^{-1}$. In another embodiment of any of the methods described herein, the graphene carbon nanomaterial exhibits a 2D peak in the Raman spectrum between 2679 and 2698 cm$^{-1}$. In yet another embodiment of any of the methods described herein, the graphene carbon nanomaterial exhibits a 2D peak in the Raman spectrum at 2679 cm$^{-1}$.

One embodiment is a method of forming graphene carbon nanomaterial comprising (i) heating a carbonate electrolyte to obtain a molten carbonate electrolyte; (ii) disposing the molten carbonate electrolyte between an electrolysis anode and an electrolysis cathode in a cell; (iii) applying an electrical current to the electrolysis cathode and the electrolysis anode in the cell to electrolyze the carbonate and produce carbon nanomaterial on the electrolysis cathode, wherein the electrolyzed carbonate is replenished by addition of carbon dioxide; (iv) placing the electrolysis cathode on which carbon nanomaterial has formed as an exfoliation anode in an electrochemical cell containing an exfoliation cathode and an exfoliation electrolyte; (v) applying an electrical voltage between the exfoliation anode and (vi) the exfoliation cathode to exfoliate graphene from the exfoliation anode; and optionally collecting graphene exfoliated from the cathode of the cell. In one embodiment, the electrolysis in step (iii) is performed in the absence of an oxide, such as an alkali metal oxide (e.g., lithium oxide).

Another embodiment refers to a system to produce graphene carbon nanomaterial, the system comprising:
a furnace chamber to accept carbonate, the furnace chamber being heated to produce molten carbonate; and
an electrolysis device having an anode and a cathode to apply electrolysis to the molten carbonate,
wherein the system is configured to (i) initially form carbon nanoplatelets on the cathode of the electrolysis device, which (ii) subsequently are used as the anode in an electrochemical exfoliation process to produce graphene carbon nanomaterial. In one embodiment, the carbon nanoplatelets are formed on the cathode in the absence of an oxide, such as an alkali metal oxide (e.g., lithium oxide).

Another embodiment relates to a method for producing carbon nano-platelets (e.g., a two dimensional layered graphene product) comprising:
(a) heating a carbonate electrolyte to obtain a molten carbonate electrolyte, wherein the molten carbonate may optionally further comprise a metal (such as zinc) which is molten at the temperature at which electrolysis is performed step (c);
(b) disposing the molten carbonate electrolyte between an electrolysis anode and an electrolysis cathode in a cell; and
(c) applying an electrical current to the electrolysis cathode and the electrolysis anode in the cell to electrolyze the carbonate and generate carbon nano-platelets on the electrolysis cathode, without the formation of transition metal nucleation sites on the cathode. The formation of transition metal nucleation sites may be inhibited, suppressed or prevented by any of the techniques described herein.

In one embodiment, the electrolysis anode and the molten carbonate electrolyte do not include a transition metal nucleating agent (e.g., the electrolyte and anode do not release transition metal agents which facilitate nucleation of carbon on the cathode).

In another embodiment, the cathode (prior to and/or during the reaction provided by step (c)) also does not include a transition metal nucleating agent. In yet another embodiment, the cathode includes one or more transition metals, but the transition metals do not facilitate the formation of nucleation sites for carbon product formation in step (c) (for example by adding an oxide to decrease the solubility of the transition metals in the electrolyte and at or near the cathode). In another embodiment, the method further includes electrochemically exfoliating the carbon nano-platelets (for example, from a second anode) to produce graphene.

Another embodiment relates to a method for producing carbon-onions (e.g., a three-dimensional concentric spherical layered graphene product) comprising:
(a) heating a carbonate electrolyte comprising an oxide additive (e.g., an alkali metal oxide such as lithium oxide) to obtain a molten carbonate electrolyte;
(b) disposing the molten carbonate electrolyte between an electrolysis anode and an electrolysis cathode in a cell, wherein the electrolysis anode and the molten carbonate electrolyte do not include a transition metal nucleating agent;
(c) applying an electrical current to the electrolysis cathode and the electrolysis anode in the cell to electrolyze the carbonate and generate carbon nano-onions on the electrolysis cathode, without the formation of transition metal nucleation sites on the cathode.

In one embodiment, the electrolysis anode and the molten carbonate electrolyte do not include a transition metal nucleating agent (e.g., the electrolyte and anode do not release transition metal agents which facilitate nucleation of carbon on the cathode).

In another embodiment, the cathode (prior to and/or during the reaction provided by step (c)) also does not include a transition metal nucleating agent. In yet another embodiment, the cathode includes one or more transition metals, but the transition metals do not facilitate the formation of nucleation sites for carbon product formation in step (c) (for example by adding an oxide to decrease the solubility of the transition metals in the electrolyte and at or near the cathode).

In another embodiment, the method further includes electrochemically exfoliating the carbon nano-onions (for example, from a second anode) to produce graphene.

Another embodiment is a system to produce carbon nano-onions (e.g., a three-dimensional concentric spherical layered graphene product) comprising:
- a furnace chamber to accept carbonate, the furnace chamber being heated to produce molten carbonate which comprises an oxide additive (e.g., an alkali metal oxide, such as lithium oxide); and
- an electrolysis device having an anode and a cathode to apply electrolysis to the molten carbonate, wherein the system is configured to form carbon nano-onions on the cathode of the electrolysis device, without the formation of transition metal nucleation sites on the cathode.

In one embodiment, the anode and the molten carbonate electrolyte do not include a transition metal nucleating agent (e.g., the electrolyte and anode do not release transition metal agents which facilitate nucleation of carbon on the cathode).

In another embodiment, the cathode (prior to and/or during the reaction provided by step (c)) also does not include a transition metal nucleating agent.

In yet another embodiment, the cathode includes one or more transition metals, but the transition metals do not facilitate the formation of nucleation sites for carbon product formation during electrolysis.

In one embodiment, the system is further configured to subject the carbon nano-onions to an electrochemical exfoliation process to produce graphene carbon nanomaterial (for example, by subsequently using the cathode of the electrolysis device as the anode in the electrochemical exfoliation process).

Another embodiment relates to a method for producing carbon nano-onions (e.g., a three-dimensional concentric spherical layered graphene product) comprising: (a) heating a carbonate electrolyte comprising an oxide additive to obtain a freshly melted carbonate electrolyte;
(b) disposing the freshly melted carbonate electrolyte between an electrolysis anode and an electrolysis cathode in a cell, wherein the electrolysis anode and/or the molten carbonate electrolyte optionally further comprises a transition metal nucleation agent; (c) applying an electrical current to the electrolysis cathode and the electrolysis anode in the cell to electrolyze the freshly melted carbonate and generate carbon nano-onions on the electrolysis cathode (e.g., without the formation of transition metal nucleation sites on the cathode).

In one embodiment of the methods described herein for producing nano-onions, a constant current is applied during the electrolysis.

In another embodiment of the methods described herein for producing nano-onions, the method further includes electrochemically exfoliating the carbon nano-onions (for example, from a second anode) to produce graphene.

Another embodiment relates to a method for producing graphene carbon nano-scaffolds, which may be achieved by, e.g., suppressing the concentration of lithium in the electrolyte, such as by replacing a portion of the lithium carbonate with a non-lithium carbonate, containing a larger than lithium cation (e.g., sodium or potassium), and simultaneously inhibiting the formation of transition metal nucleation sites on the cathode comprising:
(a) heating a carbonate salt to obtain a molten carbonate electrolyte enriched in non-lithium salts;
(b) disposing the molten carbonate electrolyte between an electrolysis anode and an electrolysis cathode in a cell, wherein the electrolysis anode and/or the molten carbonate electrolyte optionally further comprises a transition metal nucleation agent; and
(c) applying an electrical current to the electrolysis cathode and the electrolysis anode in the cell to electrolyze the carbonate and generate carbon nano-scaffolds, wherein if a transition metal nucleation agent is present, inhibiting activation of the transition metal nucleation agent during step (c).

In one embodiment, the suppression of the lithium salt in the electrolyte is achieved by conducting the process in an electrolyte comprising a carbonate salt containing less than about 50%, 60%, 70%, 75%, 80%, 90%, or 100% lithium carbonate and enriched in non-lithium carbonates (e.g., $Na_2CO_3$ or $K_2CO_3$, or a combination thereof), based upon 100% total weight of carbonate salts in the electrolyte. For instance, the electrolyte may comprise from about 10, 20, 30, 40, 50, 60, 70, 80, or 90% lithium carbonate, based upon 100% total weight of carbonate salts in the electrolyte. The electrolyte may contain from about 10, 20, 30, 40, 50, 60, 70, 80, or 90% of a non-lithium salt (such as $Na_2CO_3$ or $K_2CO_3$, or a combination thereof), based upon 100% total weight of carbonate salts in the electrolyte.

In one embodiment, formation of transition metal nucleation sites is inhibited by conducting step (c) at a temperature less than about 700° C.

In one embodiment of the above methods and systems, the cathode (prior to and/or during the reaction provided by step (c)) also does not include a transition metal nucleating agent. In another embodiment, the cathode includes one or more transition metals, but the transition metals do not facilitate the formation of nucleation sites for carbon product formation in step (c). In a further embodiment, the electrolysis anode and the molten carbonate electrolyte do not include a transition metal nucleating agent. In another further embodiment, the electrolysis is conducted at high current density, such as at least 0.4 A cm$^{-2}$ or higher to inhibit formation of transition metal nucleation sites.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate, by way of example only, embodiments of the present invention:

In FIG. 1A, $CO_2$ from the air or flue gas is electrolytically split to carbon nanoplatelets by molten carbon electrolysis. In FIG. 1B, the carbonate synthesis cathode is placed in a cellulose tube containing e.g., aqueous $(NH_4)_2SO_4$. In FIG. 1C, the cellulose tube is placed in an $(NH_4)_2SO_4$ bath and exfoliated.

FIG. 2 shows the formation of carbon platelets.

FIG. 3B depicts the measured cell potential during electrolysis.

FIG. 6 shows the formation of carbon nano-onions.

FIGS. 10C1-10C6 show SEM images of the electrolytic product produced under conditions of a decrease in electrolysis temperature and a decrease in concentration of lithium carbonate.

DETAILED DESCRIPTION OF THE INVENTION

Figure 1:
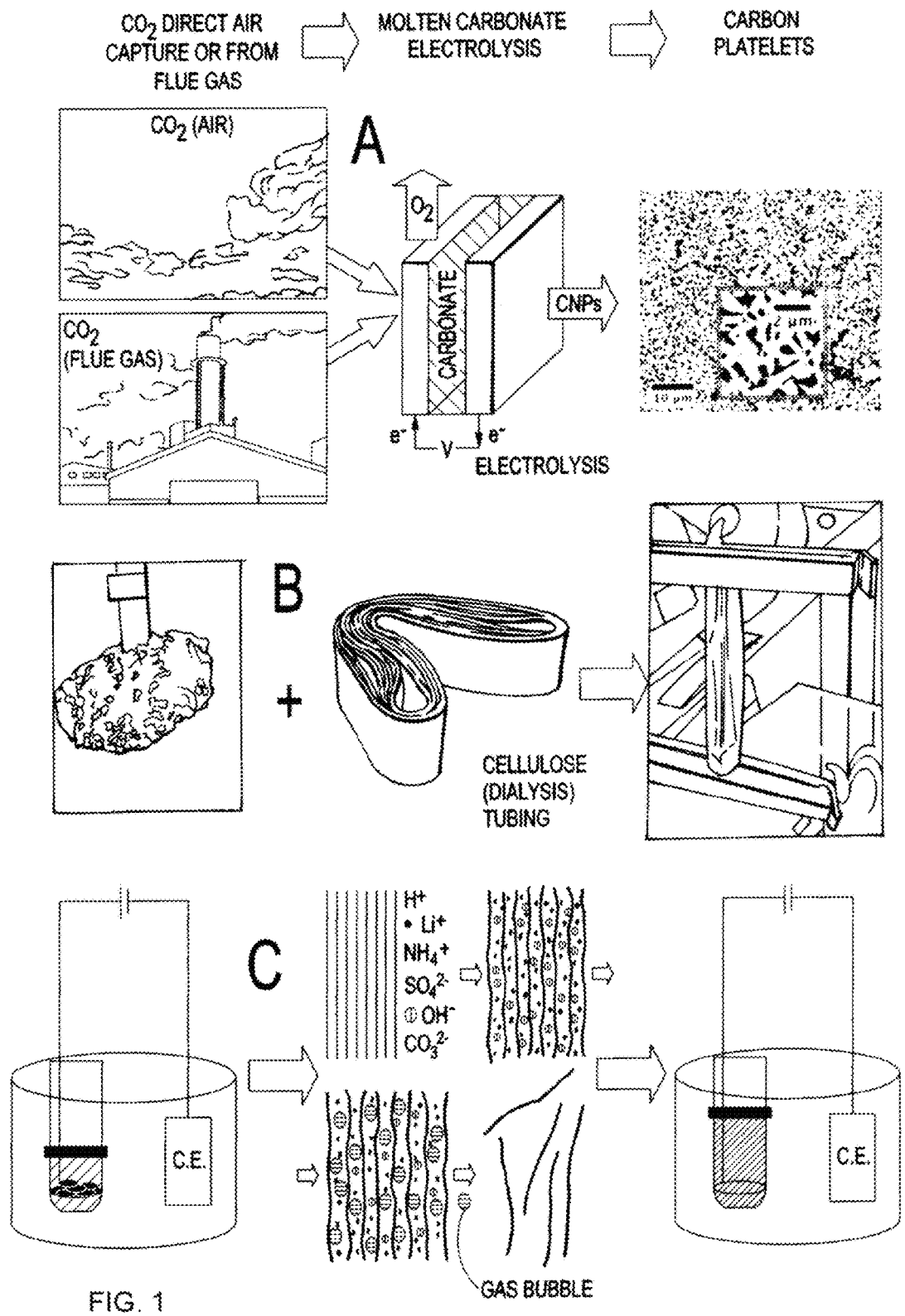
FIG. 1 depicts an exemplary illustration of the method of electrosynthesis of graphene from $CO_2$.

It will be understood that any range of values described herein is intended to specifically include any intermediate value or sub-range within the given range, and all such intermediate values and sub-ranges are individually and specifically disclosed.

It will also be understood that the word "a" or "an" is intended to mean "one or more" or "at least one", and any singular form is intended to include plurals herein.

It will be further understood that the term "comprise," including any variation thereof, is intended to be open-ended and means "include, but not limited to," unless otherwise specifically indicated to the contrary.

When a list of items is given herein with an "or" before the last item, any one of the listed items or any suitable combination of two or more of the listed items may be selected and used.

The term "nanomaterial" generally refers to a material (i) having at least one limiting dimension of size less than 1000 nm, but other dimensions in the material can be larger (for example, carbon nanotubes with length much longer than 1000 nanometers are still carbon nanomaterials when their diameter (rather than their length) is less than 1000 nanometers), (ii) where the structure of the material may be nanometer dimension building blocks (e.g., many layers of graphene) repeated to a greater than 1000 nm size, or (iii) composed of walls which have a nanoscopic thickness (even if the diameter of the material is greater than 1000 nanometers).

The processes described herein include the synthesis of carbon nanomaterials and their subsequent conversion to graphene.

The present process splits carbon dioxide by electrolysis in molten carbonate. Isotopic $^{13}C$ tracking may be used to follow the consumption of $CO_2$, as it is dissolved in molten carbonate and is split by electrolysis to form carbon nanomaterials, such as carbon nanoplatelets. $CO_2$ dissolution in molten lithium carbonate is exothermic and rapid, which along with heat generated by the electrolysis provides thermal balance during carbon deposition on the cathode. The process (in the absence of a transition metal nucleating agent) where electrolysis is performed with lithium carbonate forms carbon nanomaterials (CNM), oxygen and dissolved lithium oxide:

$$\text{Electrolysis: } Li_2CO_3 \rightarrow C_{CNM} + O_2 + Li_2O \quad (1a)$$

The electrolyte used in the electrolysis step to produce the carbon nanomaterials may be pure lithium carbonate ($Li_2CO_3$) or may contain lithium carbon with one or more of added oxides, added sodium, calcium, or barium carbonates, or added boron, sulfur, phosphorus or nitrogen dopants, or any combination of any of the foregoing. $CO_2$ added to the electrolyte dissolves and chemically reacts with lithium oxide to renew and reform $Li_2CO_3$:

$$\text{Chemical Dissolution: } CO_2 + Li_2O \rightarrow Li_2CO_3 \quad (2)$$

In the processes described herein, carbon nanomaterials, such as carbon nanoplatelets, are formed by molten carbonate electrolysis when transition metal nucleating agents (e.g., transition metals other than zinc) are excluded. The processes described herein may be facilitated by increasing the electrolysis current in a step-wise manner prior to the constant current electrolysis:

$$\text{Electrolysis: } Li_2CO_3 \rightarrow C_{platelets} + O2 + Li_2O \quad (1b)$$

In one embodiment, to avoid formation of carbon nanotubes (CNT), the electrolyte and cathode surface are substantially free or free of transition metal nucleating agents, such as nickel or chromium, which can nucleate CNT formation.

The carbon nanomaterials, such as carbon platelets, are then converted to graphene by exfoliation:

$$\text{Exfoliation(DC voltage): } C_{platelets} \rightarrow C_{graphene} \quad (3)$$

In addition to carbon nanomaterial (such as carbon platelet) formation, the second product of molten carbonate $CO_2$ electrolysis in Equation 3 is the evolution of pure oxygen, O2, during the electrolysis. As illustrated in FIG. 1, the net reaction of Equations 1b, 2 and 3 is $CO_2$ split by electrolysis into graphene and oxygen:

$$CO_2 \rightarrow C_{graphene} + O_2 \quad (4)$$

$CO_2$ electrolysis in molten carbonate production of carbon nanomaterials readily scales upward linearly with the area of the electrolysis electrodes, facilitating larger scale synthesis of graphene. The molten carbonate carbon nanomaterial electrolysis anode is not consumed and emits oxygen. The molten carbonate electrolysis does not consume carbon as a reactant and uses a no-cost oxide as the reactant to be reduced.

The carbon nanomaterial product resides on the cathode, which therefore may be stacked vertically in a low physical footprint configuration. The carbon nanomaterial molten carbonate electrolysis process can operate under relatively mild conditions (such as 770° C.) in a molten carbonate electrolyte at 0.8 to 2 V potential. The electricity costs per tonne are estimated as $360 compared to the known costs of $602 per tonne for aluminum. These inexpensive costs provide a significant incentive to use the greenhouse gas carbon dioxide as a reactant to produce graphene. The processes described herein provide a useful path forward to help break the anthropogenic carbon cycle to mitigate climate change.

EXAMPLES

Example I

Figure 2:
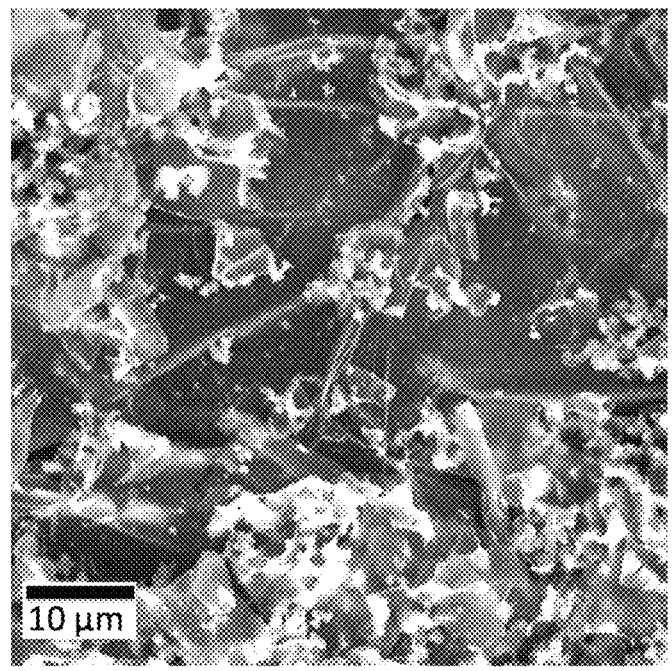
FIG. 2 is a scanning electron microscopy (SEM) image of the electrolysis product formed by splitting $CO_2$ in molten carbonate in the absence of nickel nucleation and in the presence of zinc.

Small transition metal clusters, including nickel, chromium and others, act as nucleation points to facilitate high yield C2CNT carbon nanotube growth. Zinc, although liquid at molten carbonate temperatures, lowers the energy of the initial carbon deposition. In the absence of a solid transition metal as nucleating agent (nucleating point), galvanized (zinc coated) steel was still shown to be an effective cathode for carbon growth, but CNTs were scarce, comprising <1% of the carbon product. Instead the product, as shown in FIG. 2, is an impure mix of ultra-thin carbon platelets, other carbon nanostructures and amorphous carbon. FIG. 2 shows an SEM image of the washed cathode product from a nickel free, 90 minute, 1 A constant current electrolysis in 730° C. molten $Li_2CO_3$ with 6 m (6 moles/kg $Li_2CO_3$) $Li_2O$ (Alfa Aesar 99.5%). The electrolysis used a 5 cm$^2$ Pt foil anode and a 5 cm$^2$ 0.12 cm diameter coiled galvanized steel wire cathode.

The noble iridium/platinum anode utilized in this example was purposely selected to inhibit carbon nanotube (CNT) formation. This enhances the observed formation of the desired graphene product by preventing introduction from the anode, migration, reduction and formation of nickel or chromium nucleation sites on the cathode that favor formation of alternative CNT products. However, an iridium, platinum or iridium alloy anode is not a prerequisite for high yield platelet or graphene growth. The inhibition of low levels of nickel migration from a nickel or nickel containing alloy anode or use of a thin film (e.g., between about 10 and about 100,000 nm thick, such as between about 50 and about 10,000 nm thick, or between about 100 and about nm thick) iridium anode is viable. The following references describe thin film iridium deposition: Grushina et al., *J. Appl. Chem. USSR*, 2015, 1992, 65; Kamegaya et al., *Electrochimica Acta*, 1995, 40, 889; Ohsaka et al., *Int. J. Surface Eng. Coatings* 2007, 85, 260; Ohsaka et al., *Electrochem, Solid-State Lett.*, 2010, 13, D65; Shuxin et al., *Rare Metal Mat. Eng.*, 2015, 44, 1816; Lopez et al., *Int. J. Electrochem. Sci.*, 2015, 10, 9933; Allahyarzadeh et al., *Surface Rev. Lett.*, 2016, 23, 1630001; and Sheela et al., *Int. J. Surface Eng. Coatings*, 2017, 8:5, 191.

A mixture of nanostructures including a large fraction of platelets forms during the first few minutes (e.g., 5 minutes) of electrolysis, even in the presence of nickel. However, in the presence of nickel with extended electrolysis time (such as, e.g., 15 minutes), the product quickly resolves into carbon nanotubes. This is the case with a wide range of lithiated electrolytes, using a wide range of metal cathodes, including galvanized steel and copper, and over a range of electrolysis temperatures from 730 to 790° C. Higher temperatures, which were not used in this study, increasingly favor the two electron reduction of $CO_2$ to CO, and by 950° C. the product is pure carbon monoxide.

Example II

In this example, it is shown that performing the electrolysis in the absence of other transition metal nucleating agents, but in the presence of zinc, carbon nano platelets, rather than carbon nano-onions (CNOs) or carbon nanotubes (CNTs), form. Zinc is present as the surface coating on the (galvanized) steel cathode. The yield of carbon platelets observed in FIG. 2 increases to 70% when the electrolyte is pure $Li_2CO_3$ rather than 6 m (6 molal) $Li_2O$, and to over 95% when increasing constant current steps (FIG. 3B) are first applied prior to the constant current. Specifically, in this electrolysis, graphite platelets are grown on a 5 cm$^2$ galvanized (zinc coated) steel cathode with a 5 cm$^2$ Pt Ir foil anode in 770° C. $Li_2CO_3$ when the electrolysis current is increased stepwise for 10 min. at 0.05 and 0.10 A, then 5 min. at 0.2 and 0.4 A followed by a constant of 1 A for 2 hours. These experimental conditions (zinc on the cathode, pure $Li_2CO_3$ electrolyte, neither Ni nor Cr in the anode, and increasing constant current steps) were chosen to increase the yield of the carbon platelets. Replicate experiments produced similar results of over 95% carbon platelets yield. The 2-hour constant current electrolysis occurs at 0.2 A cm$^{-2}$, consuming during the 2-hour electrolysis 0.82 g $CO_2$ and producing 0.21 g carbon platelets. The potential of the stepped current electrolysis and the electrolysis product are presented in FIG. 4B. The product purity is over 95%. The remainder includes smaller particles, which also contain smaller platelets. X-ray diffraction (XRD) of the product (FIG. 3G) exhibits a sharp peak at 26.3° 2θ, indicative of a high degree of graphitic allotrope crystallinity. Raman spectroscopy (FIG. 3F) and TEM (FIG. 3A), indicates the platelets have a relatively low number (25 to 125) graphene layers. Without wishing to be bound by theory, the inventor theorizes that by starting with fewer graphene layers compared to graphite, these ultrathin platelets electrochemically exfoliate to a higher quality (thinner) graphene for an overall production of graphene from $CO_2$ by electrolysis and electrochemical exfoliation, in accordance with Equation 5.

An important feature for the conversion of graphite to graphene is a red shift in the Raman spectrum 2D peak compared with graphite (2720 cm$^{-1}$) (see, e.g., Zhou et al., *Mat. Lett.*, 2019, 235, 153). The 2D-band is highly sensitive to the number of graphene layers, with single layer exhibiting a peak at 2679 cm$^{-1}$, and 1-4 layers exhibiting a peak at 2698 cm$^{-1}$. Even prior to electrochemical exfoliation, the ultrathin carbon platelets produced by molten carbonate synthesis (FIG. 3F) exhibit a significant red shift to 2708 cm$^{-1}$. In FIG. 3F, the intensity ratio $I_D/I_{D'}$ is 1.3, demonstrating that for the whole range of $I_D/I_{D'}$, the defect level is always below the benchmark for graphene boundary defects ($I_D/I_{D'}$=3.5). (The ratio $I_D/I_{D'}$ represents the intensity ratio for the D peak (1350 cm$^{-1}$) and D' peak (1620 cm$^{-1}$).) The ratio of Raman D or 2D to the G peaks are respectively associated with the number of defects and degree of graphitization. In FIG. 3F, the intensity ratio of the Raman $I_D/I_G$ peak is a low (0.4), and that of Raman $I_{2D}/I_G$ is 0.6, which both indicate a small quantity of defects. (The ratio $I_D/I_G$ represents the intensity ratio for the D peak (1350 cm$^{-1}$) and G peak (1583 cm$^{-1}$).)

Example III

In this example, it is shown that lithium carbonate entrapped with the carbon platelets produced during the electrolysis described in Example II can be readily removed by dissolution in aqueous ammonium sulfate solutions.

Unlike $Na_2CO_3$ and $K_2CO_3$ which are highly soluble in water, $Li_2CO_3$ has a low solubility (30.6, 113 and 1.2 g per 100 g $H_2O$, respectively, at 250° C.). Aqueous ammonium sulfate is one of the few media in which $Li_2CO_3$ solubility is enhanced.

An aqueous medium was investigated capable of both sustaining exfoliation and conducive to the dissolution of excess lithium carbonate electrolyte that congealed on the cathode during the molten lithium carbon electrolytic production and extraction and cooling of the cathode containing the carbon product. These solubility measurements are summarized below. Solubility is measured both by incremental addition of lithium carbonate (Alfa Aesar) to water, or ammonium sulfate (Alfa Aesar) in water until observation of excess lithium carbonate, and by dilution of excess lithium carbonate until observation of complete dissolution.

Figure 4:
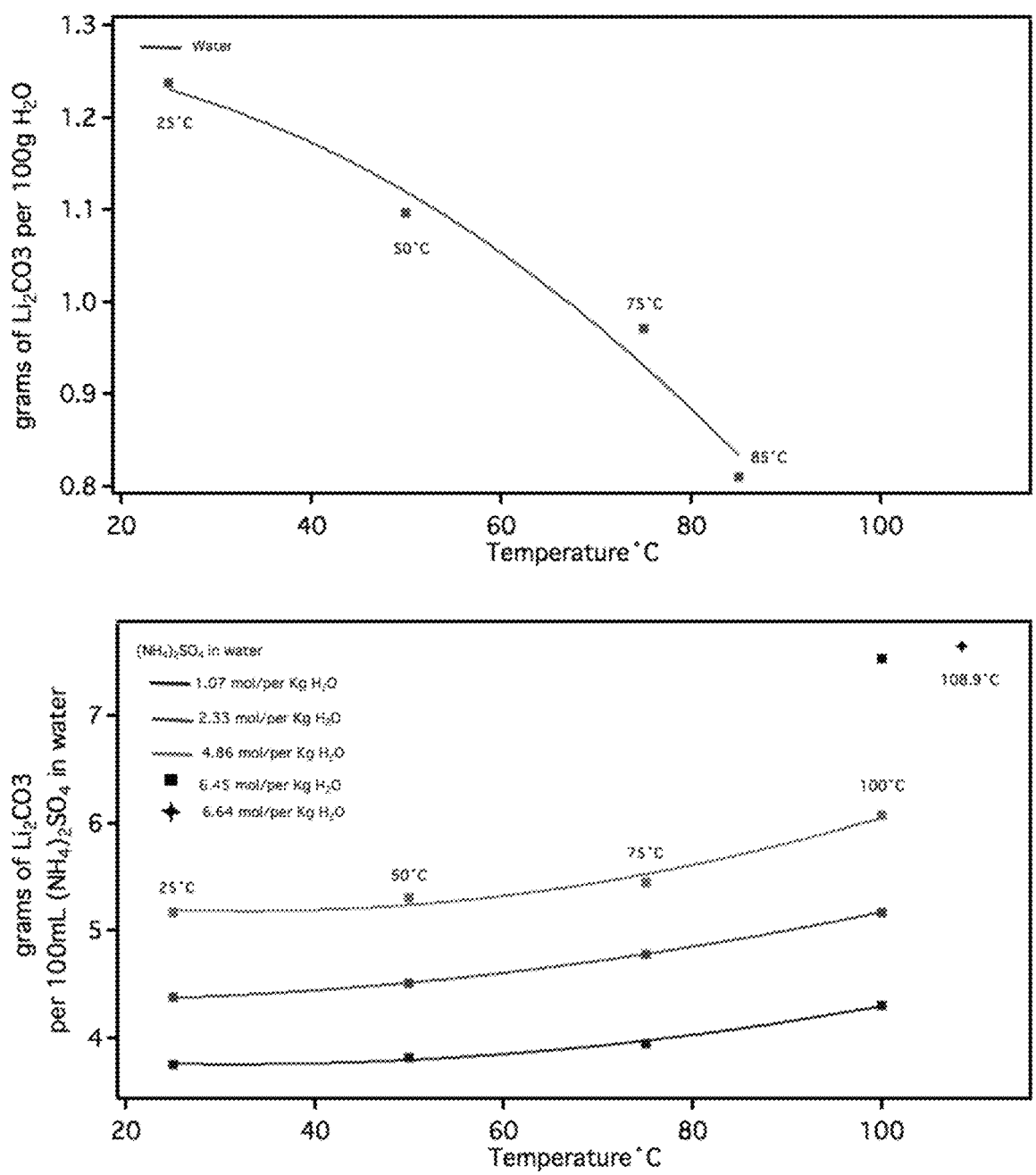
FIG. 4 shows the solubility of $Li_2CO_3$ in water (top graph) and various aqueous $(NH_4)_2SO_4$ solutions (bottom graph) as a function of temperature.

Interestingly, whereas the aqueous solubility of sodium and potassium carbonate are high (30.6, and 113 per 100 g $H_2O$ respectively at 25° C.) and increase with temperature (43.9/46, and 140/156 g $H_2O$, respectively, at 80/100° C.), the measured aqueous solubility of lithium carbonate is low and decreases with increasing temperature, as shown in the top trace of FIG. 4. The aqueous solubility of lithium carbonate (1.2 g per 100 g $H_2O$ at 25° C.) is low compared to the aqueous solubilities of lithium chloride and lithium bromide (18.0 g and 17.5 per 100 g $H_2O$ respectively at 250° C.), and increases with temperature (to 112/128, and 245/266 g $H_2O$, respectively, at 80/100° C.).

Figure 5:
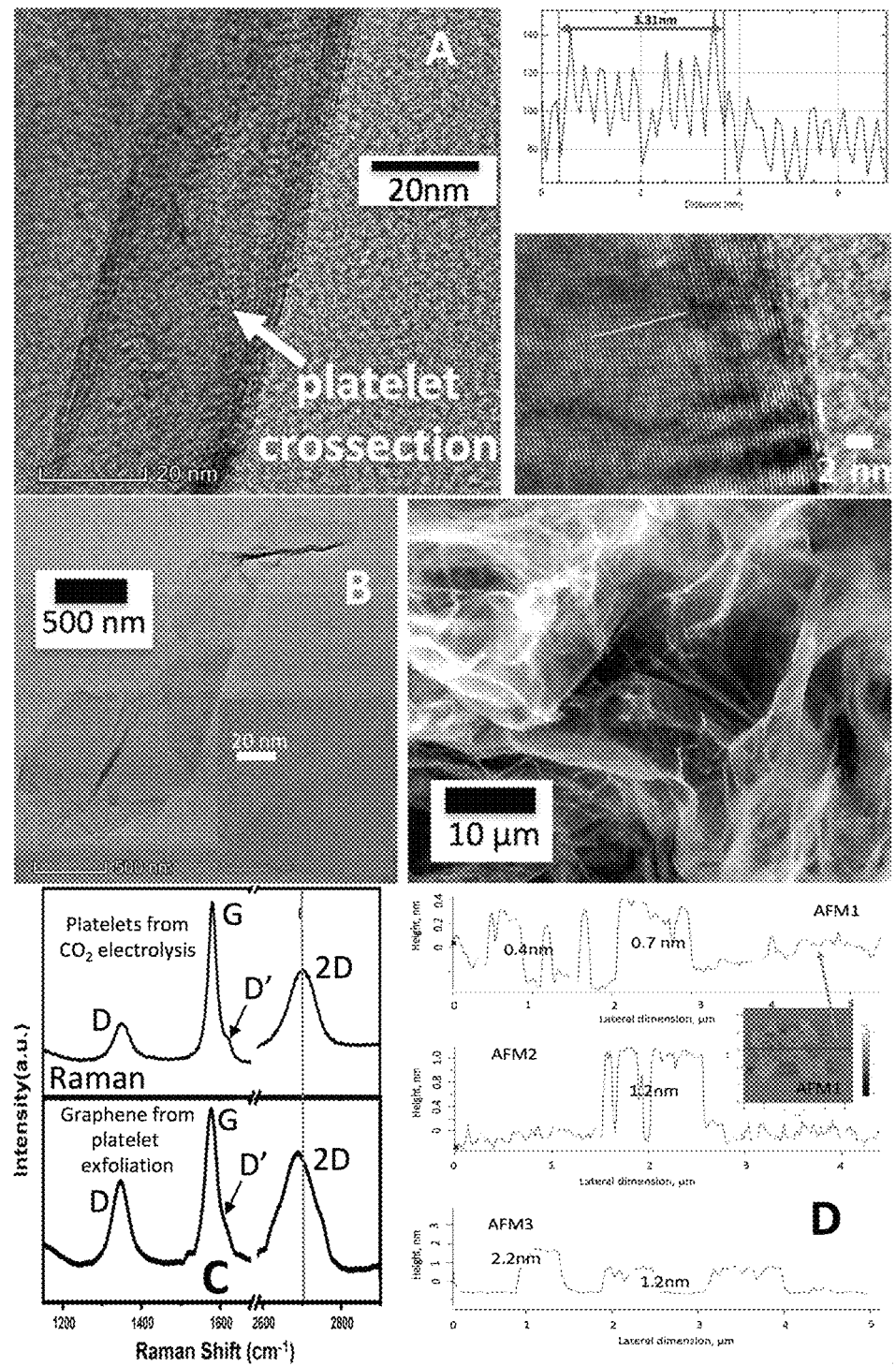
FIG. 5 shows tunneling electron microscopy (TEM) (FIGS. 5A and 5B, prior to exfoliation and subsequent to exfoliation, respectively), Raman spectroscopy (FIG. 5C) and atomic force microscopy (ASM) images (FIG. 5D) of a graphene product prepared according to the present invention.

Next, the dissolution of ammonium sulfate in water (without lithium carbonate) was verified both at room temperature and approaching the solution boiling point. See Table 1. These measurements were conducted to verify dissolution, not to establish ammonium sulfate solubility limits, which are estimated at 15% to 20% higher than the observed maximum dissolution at each temperature. The solubility, as measured mass (grams), of lithium carbonate soluble in 100 ml of either 1.07, 2.33, 4.06 or 6.64 molal $(NH_4)_2SO_4$ is presented in the lower trace of FIG. 4. The 100° C. and 108.9° C. data in the lower trace of FIG. 5 are the measured solubility limits of lithium carbonate respectively in 6.45 or 6.64 molal ammonium sulfate. Increasing concentrations of aqueous ammonium sulfate considerably enhances lithium carbonate solubility.

TABLE 1

Dissolution of Aqueous Ammonium Sulfate Solutions as a Function of Temperature

| Temperature | $H_2O$ (g) | $(NH_4)_2SO_4$ (g) | $(NH_4)_2SO_4$ in water | | |
|---|---|---|---|---|---|
| | | | C (mol/per L solution) | C (mol/per kg solution) | C (mol/per kg $H_2O$) |
| 25° C. | 93.3 | 13.2 | 1 | 0.94 | 1.07 |
| 25° C. | 85.7 | 26.4 | 2 | 1.78 | 2.33 |
| 25° C. | 77.1 | 49.5 | 3.75 | 2.7 | 4.56 |
| 100° C. | 77.1 | 65.6 (64.3; 65.2; 65.6) | / | 3.48 | 6.45 |
| 108.5° C. | 77.1 | 67.5 (66.2; 67.3; 67.5) | / | 3.54 | 6.64 |

Example IV

In this example, it is shown that the carbon platelets formed in Example II are converted to graphene by electrochemical exfoliation.

Securing the electrochemical exfoliation electrode within a cellulose dialysis membrane can isolate the graphene product from the bulk electrolyte. The electrode within a cellulose membrane assembly is used as the anode in a two-compartment electrochemical cell, but rather than using graphite, using the cooled cathode, unwashed (carbon nano-platelet) cathode in 0.1 M $(NH_4)_2SO_4$ as shown in FIG. 1C. Specifically, the carbonate synthesis cathode containing product is cooled and placed in a cellulose tube containing aqueous 0.1 M $(NH_4)_2SO_4$. The cellulose tube is an inexpensive premium commercial cellulose dialysis membrane, (see, e.g., https://www.amazon.com/s?k=Premium-Dialysis-Tubing-Regenerated-Cellulose) listed as a cutoff of 12-14 kdals, equivalent to 1 to 2 nm pore size. As shown in FIG. 1C, the cellulose tube is placed in an 0.1 M $(NH_4)_2SO_4$ bath with a counter electrode. DC voltage is then applied that generates gas bursts between the graphene layers, exfoliating the thin platelets and producing graphene. As graphene layers are peeled, the cellulose traps them within the anode compartment.

Before exfoliation, the platelets range from 25 to 125 graphene layers as measured by TEM (see, e.g., FIG. 5A). This is consistent with the measured Raman spectrum 2D peak (graphite red shifted) at 2708 $cm^{-1}$. After exfoliation, the lateral dimensions of the exfoliated layers are 3 to 8 μm, as measured by SEM (FIG. 5B). After exfoliation, the product is filtered, rinsed and freeze dried to remove water, then analyzed by TEM, atomic force microscopy (AFM), and Raman spectroscopy. The exfoliation product yield is 83% by mass of the original carbon platelets. The product yield would likely rise with longer exfoliation times (such as more than 10 hours).

Raman spectra of sample carbon nano-platelets produced by the C2CNT technique is shown in FIG. 5C top trace and of a sample graphene produced the C2CNT technique in FIG. 5C bottom trace. The presence of the D'-band is indicative of the layered single and multiple (platelet) graphene layers, and the left shift of the 2-D band indicates the thin graphene layer.

An important feature for the conversion of graphite to graphene is a red shift in the Raman spectrum 2D peak compared with graphite (2720 $cm^{-1}$) (see, e.g., Zhou et al., Mat. Lett., 2019, 235, 153). The 2D-band is highly sensitive to the number of graphene layers, with single layer exhibiting a peak at 2679 $cm^{-1}$, and 1-4 layers exhibiting a peak at 2698 $cm^{-1}$. Even prior to electrochemical exfoliation, the ultrathin carbon platelets produced by molten carbonate synthesis (FIG. 3F) exhibit a significant red shift to 2708 $cm^{-1}$. In FIG. 3F, the intensity ratio $I_D/I_{D'}$ is 1.3, demonstrating that for the whole range of $I_D/I_{D'}$, the defect level is always below the benchmark for graphene boundary defects ($I_D/I_{D'}$=3.5). (The ratio $I_D/I_{D'}$ represents the intensity ratio for the D peak (1350 $cm^{-1}$) and D' peak (1620 $cm^{-1}$).) The ratio of Raman D or 2D to the G peaks are respectively associated with the number of defects and degree of graphitization. In FIG. 3F, the intensity ratio of the Raman $I_D/I_G$ peak is a low (0.4), and that of Raman $I_{2D}/I_G$ is 0.6, which both indicate a small quantity of defects. (The ratio $I_D/I_G$ represents the intensity ratio for the D peak (1350 $cm^{-1}$) and G peak (1583 $cm^{-1}$).

Raman spectra of sample carbon nano-platelets produced by the process described herein is shown in the FIG. 5C bottom and compared to the Raman spectra of the sample graphene produced the process described herein in. The presence of the D'-band (1620 cm$^{-1}$) is indicative of the layered single and multiple (platelet) graphene layers, and the left shift of the 2-D band indicates the thin graphene layer. Raman spectra of sample carbon nano-platelets produced by the process described herein is shown in the FIG. 5C bottom and compared to the Raman spectra of the sample graphene produced the process described herein in. The presence of the D'-band (1620 cm$^{-1}$) is indicative of the layered single and multiple (platelet) graphene layers, and the left shift of the 2-D band indicates the thin graphene layer.

In FIG. 5C, the Raman 2D peak exhibits a significant red shift from 2708 cm-1 to 2690 cm$^{-1}$ from platelets (pre-exfoliation) to graphene (post-exfoliation) product. Both the platelets (pre-exfoliation) and graphene (post-exfoliation) are red shifted from graphite (2720 cm$^{-1}$). This shift to 2690 cm$^{-1}$ is indicative of graphene ranging from to 1 to 5 graphene layers thick. Edge TEM cross section of the exfoliation product also exhibits graphene ranging from 1 layer (shown in the inset to FIG. 5B) to 5 layers thick. This is verified by AFM (see FIG. 5D). Dispersion of the graphene product for AFM characterization remains a challenge. Sonication and freeze drying effectively disperses the product, but is overly aggressive and converts the graphene from a continuous flake to "swiss cheese" like, which has the benefit of providing extra locations for depth determination (see FIG. 5D). For comparison, using graphite foil as the exfoliating reactant, rather than the molten carbonate synthesized carbon nanoplatelets, in the same experimental configuration produces multi-layered graphene that is approximately 5 fold thicker, and ranges from 6 to 25 graphene layers thick, that exhibits a Raman 2D-band peak at ~2703 cm$^{-1}$, rather than 2690 cm$^{-1}$ observed for the carbon nanoplatelet exfoliated product of Example II.

It is expected that the graphene products prepared by the processes described herein may provide improved structural materials. For example, it was observed that a key measurable characteristic correlated to strength is a low defect ratio as measured by the ratio of the ordered (G peak (1583 cm$^{-1}$), reflecting the cylindrical planar sp$^2$ bonding amongst carbons) as compared to disorder (D peak (1350 cm$^{-1}$), reflecting the out of plane sp$^3$ tetrahedral bonding amongst carbons) in the Raman spectra.

Raman spectroscopy of the graphene products prepared according to the processes described herein indicates that the exfoliation product exhibits increased defects compared to thicker pre-exfoliation platelets formed during electrolysis in molten carbonate, but that the defect level remains low and within tolerated levels for graphene. From FIG. 6C, peak ratios for graphene are compared to ratios for the platelets: the $I_D/I_{D'}$ is 1.5 (for the graphene product, compared to 1.3 for the nano-platelets), again demonstrating that for the whole range of $I_D/I_{D'}$, the defect level is always below the benchmark for graphene boundary defect ratio of $I_D/I_{D'}$=3.5. The intensity ratio of the Raman $I_D/I_G$ peak is 0.64 (for the graphene product, compared to 0.4 for the nano-platelets) and that of Raman $I_{2D}/I_G$ is 0.70 (for the graphene product, compared to 0.6 for the nano-platelets), which both indicate a small amount of defects.

The majority of the applied exfoliation voltage is lost through resistance drop over the 0.1 M ammonium sulfate solution. This may be avoided by placing the electrodes closer together and/or higher ionic strength to lower energy requirements. The temperature can be increased and the cellulose membrane can also be modified to minimize the voltage drop and also increase the sustainable current density (and rate of exfoliation).

Example V

The processes and systems described herein can also be modified and used to produce other carbon nanomaterials (CNMs), including graphene, nano-onions, nano-platelets, nano-scaffolds and helical carbon nanotubes. It is observed that each of these CNMs exhibit unusual and valuable physical chemical properties, such as, for example, lubrication (nano-onions), batteries (graphene) and environmental sorbents (nano carbon aerogels) prior to addition to structure materials, and enhanced properties including improved electrical conductivity and sensing ability for CNM-structural material composites. In each case, the product may be synthesized to a high coulombic efficiency of over 95%, and in most cases the product had a purity over 95%.

Example VI

Figure 6:
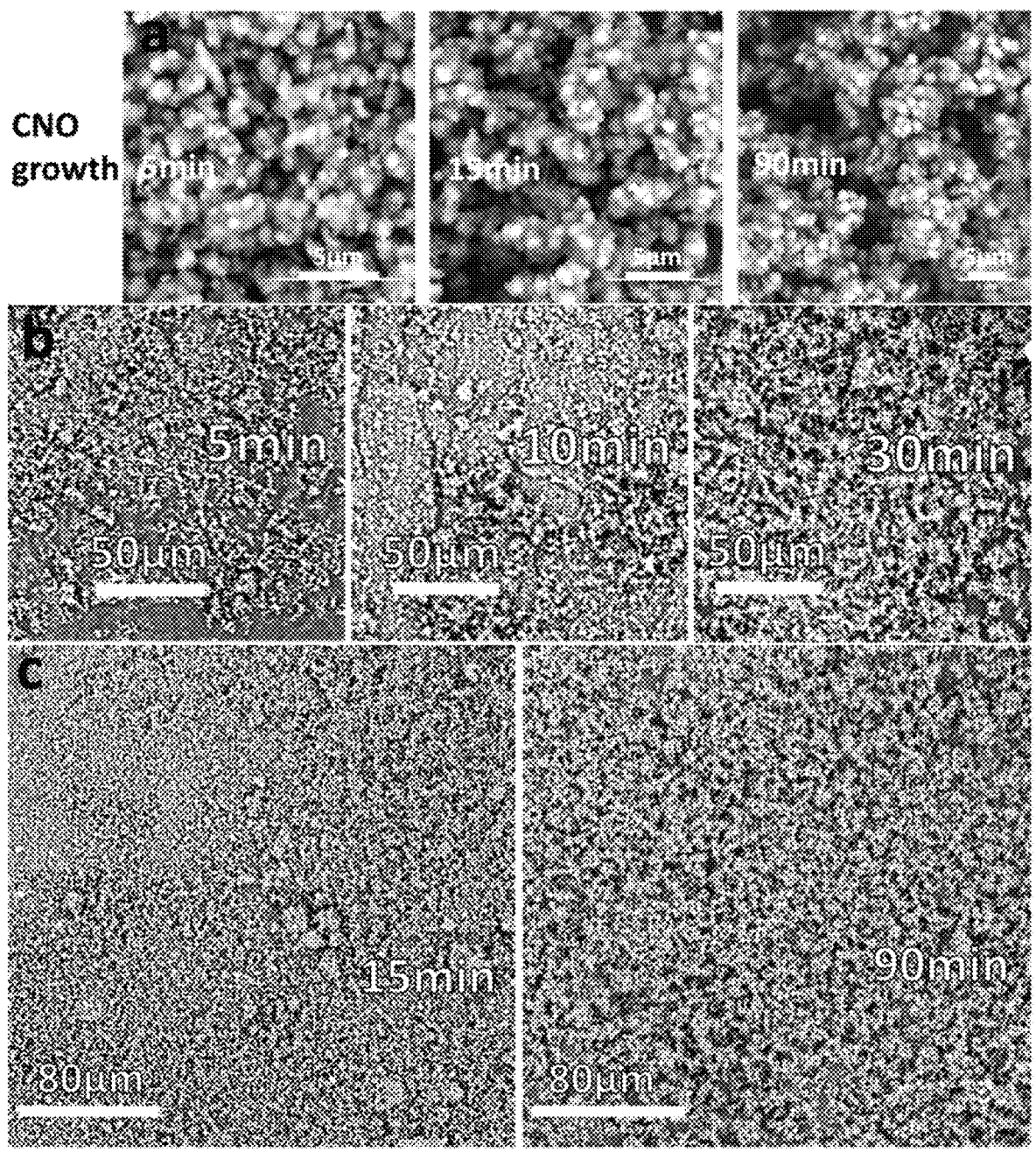
FIG. 6 is a SEM image of the electrolysis product formed by splitting $CO_2$ in molten carbonate in the absence of in the absence of a transition metal nucleating agents and in the presence of lithium oxide.

In this example, it is shown that performing the electrolysis in the absence of a nickel and the near exclusion of any other impurity level transition metal nucleating agents, and in the absence of a stepwise current increase, but in the presence of lithium oxide, which can serve to decrease solubility of any impurity presence of other transition metals, results in the formation of another graphene based morphology consisting of concentric spherical layers of graphene and resulting in a high yield of carbon nano-onions (CNOs), rather than the carbon nano platelets comprising two planar layered graphene as observed in Example II. Zinc is present as the surface coating on the (galvanized) steel cathode. The yield of carbon nano-onions shown in FIG. 6 is over 95%. Applications for inexpensive CNOs include supercapacitors, battery anodes, and solid-lubricants. The geologic (graphite-like durability) stability of graphene allotrope carbon materials may provide a long-term repository to store atmospheric $CO_2$. SEM, EDS, and TEM characterization provides fundamental evidence of the high yield and purity of the CNO synthesis. Specifically, in this electrolysis, highly uniform carbon spheroids are grown on a 5 cm$^2$ galvanized (zinc coated) steel cathode with a 5 cm$^2$ Pt Ir foil anode in 770° C. $Li_2CO_3$ containing 5.9 molal $Li_2O$ when the electrolysis current is held constant at 1 A (0.2 A/cm$^2$) for 1.5 hours. As measured by EDS, the carbon content of the product is over 99%, the purity of carbon spheroids in the product is over 95%, and the coulombic efficiency of the electrolysis is over 95%. FIG. 6A shows an SEM trace of the product following 5 minutes, 15 minutes or 90 minutes of electrolysis. As can be seen, the distinct carbon spheroid shape is evident even with an electrolysis duration of 15 minutes or less. FIG. 6C presents an overview (lower magnification SEM) of the various syntheses presented (at higher magnification) in FIG. 6B. In each case, the product is highly uniform diameter carbon spheroids. Each of the spheroids in FIG. 6B is in turn formed from clusters of nano-onions.

Figure 7:
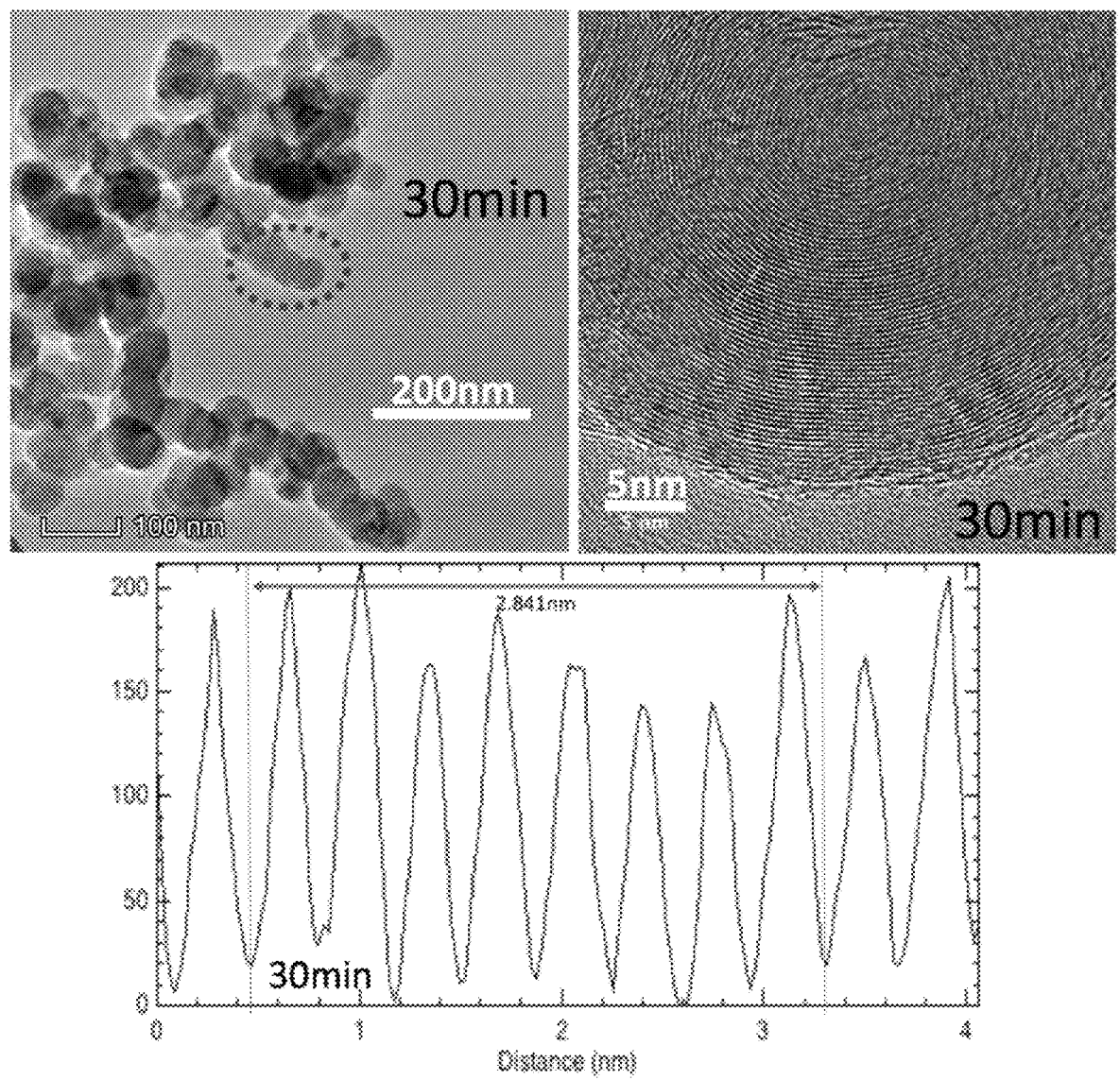
FIG. 7 shows TEM images showing a carbon nano-onion product. The bottom of FIG. 7 shows the interspatial graphene layer between the individual CNT walls in the adjacent SEM, and that the distance between 8 walls is 2.841 nm amounting to 0.255 nm between layers.

FIG. 7 shows a TEM of the carbon nano-onion (CNO) product after 30 minutes of electrolysis. The distinctive concentric, shell morphology of carbon nano-onions with a 0.35 nm interlayer separation typical of layered graphitic structures is evident. Not shown in the figure is that the separated, as well as individual bundled nano-onions in the spheroids, have an increasing average diameter with increasing electrolysis time, as measured by Image SEM automated optical counting software. Respectively after 5, 30, and 90 minutes of electrolysis, the individual CNOs have an increasing diameter of 38±10 nm, 66±6 nm and 96±2 nm, while the spheroids (bundled nano-onions) have a combined ten-fold higher respective diameter of 400, 600, and 900 nm, as seen in FIG. 6B. While the short duration (5 minutes) electrolysis formed nano-onions have a distinctive size, unlike the longer duration syntheses, the product after 5 minutes of electrolysis does not yet exhibit the distinctive concentric spherical graphene shells evident in FIG. 7.

Figure 8:
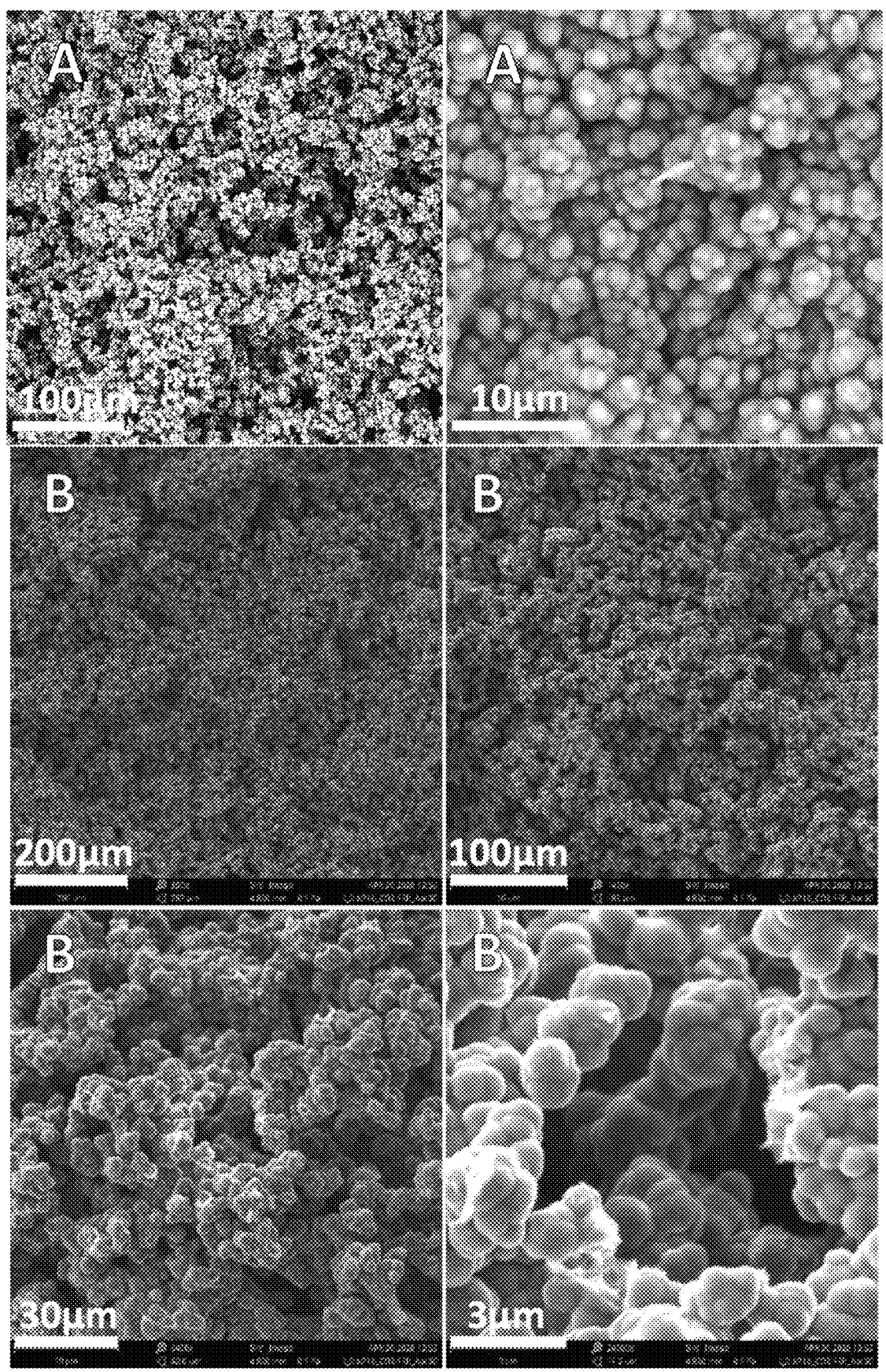
FIG. 8 shows SEM images showing a carbon nano-onion product subsequent to extended duration electrolysis.

As seen in the SEM of FIG. 8A, extended electrolysis (15 hours, rather than 1.5 hours), at lower current density (0.1, rather than 0.2, A/cm²) produces more of the carbon nano-onion product, but not a significantly larger size of the carbon nano-onion product.

The SEM traces shown in FIG. 8B depict the product of a procedure in which carbon nano-onions are formed even in the presence of a transition metal which has been inhibited from promoting carbon nucleation. Generally, in an aged lithium carbonate electrolyte a high purity, uniform CNT product is obtained during an electrolysis at a controlled temperature in the 700° C. range, and the degree to which the carbon nanotube product is tangled or straight, long or short, or thick or thin can be controlled by additives to the lithium carbonate electrolyte, current density, electrolysis duration, and choice of anode or cathode material. However, when the electrolyte is not aged, the product can be a partial or pure carbon nano-onion product instead. Aging refers to allowing the electrolyte to sit in a molten state for a period of several hours to several days prior to use. Subsequent to initiation of an electrolysis in a freshly melted solution, it is observed there is a time, for example one hour, before $CO_2$ is fully absorbed in the electrolyte. After that period, $CO_2$ is fully absorbed up to a rate equivalent to the 4 Faraday per mole $CO_2$ of the constant current applied in the electrolysis. It is observed that the activation period for $CO_2$ to be absorbed during the electrolysis start-up can be shortened by 2 to 3-fold when $Li_2O$ has been added to the lithium carbonate electrolyte. This period of time appears to correlate with the necessary time for the molten carbonate to achieve a steady state concentration of $Li_2O$, for example in accord with the equilibrium reaction:

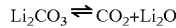

$$Li_2CO_3 \rightleftharpoons CO_2 + Li_2O$$

Without wishing to be being bound by any theory, it is proposed that transition metal nucleation of carbon nanotube growth is inhibited during this initiation period of electrolyte activation. Specifically, an electrolysis is conducted in freshly melted 770° C. molten $Li_2CO_3$ using a Muntz brass cathode and Inconel 718 anode both with active area of 2450 cm². The electrolysis is conducted at 0.2 A/cm² for a duration of 16 hours. As shown in FIG. 8B, the washed cathode product is pure carbon nano-onions without any evidence of carbon nano-tubes.

Example VII

In this example, it is shown that performing the electrolysis in a high concentration sodium or potassium molten carbonate electrolyte forms an alternative graphene product, carbon nano-scaffolds. Rather than a flat, multilayered graphene platelet morphology, carbon nano-scaffolds consist of a morphology in which multilayered graphene is stacked at sharp angles in an open structure, This open structure is not only aesthetically distinct, but exposes a larger surface area of graphene, which has the potential to increase activity in graphene capacitor, battery, EMF shielding and catalytic applications. Furthermore, the conditions of carbon nano-scaffold growth are distinctive from the platelet growth conditions described above. Specifically, unlike the avoidance of transition metals to prevent competitive growth of an alternative carbon nanotube product, here (i) transition metal ions are permitted, for example as introduced by the anode, and the molten carbonate $CO_2$ electrolysis is conducted in (ii) electrolytes and/or at (iii) temperature conditions that are specifically not conducive to carbon nanotube (CNT) growth.

Figure 9:
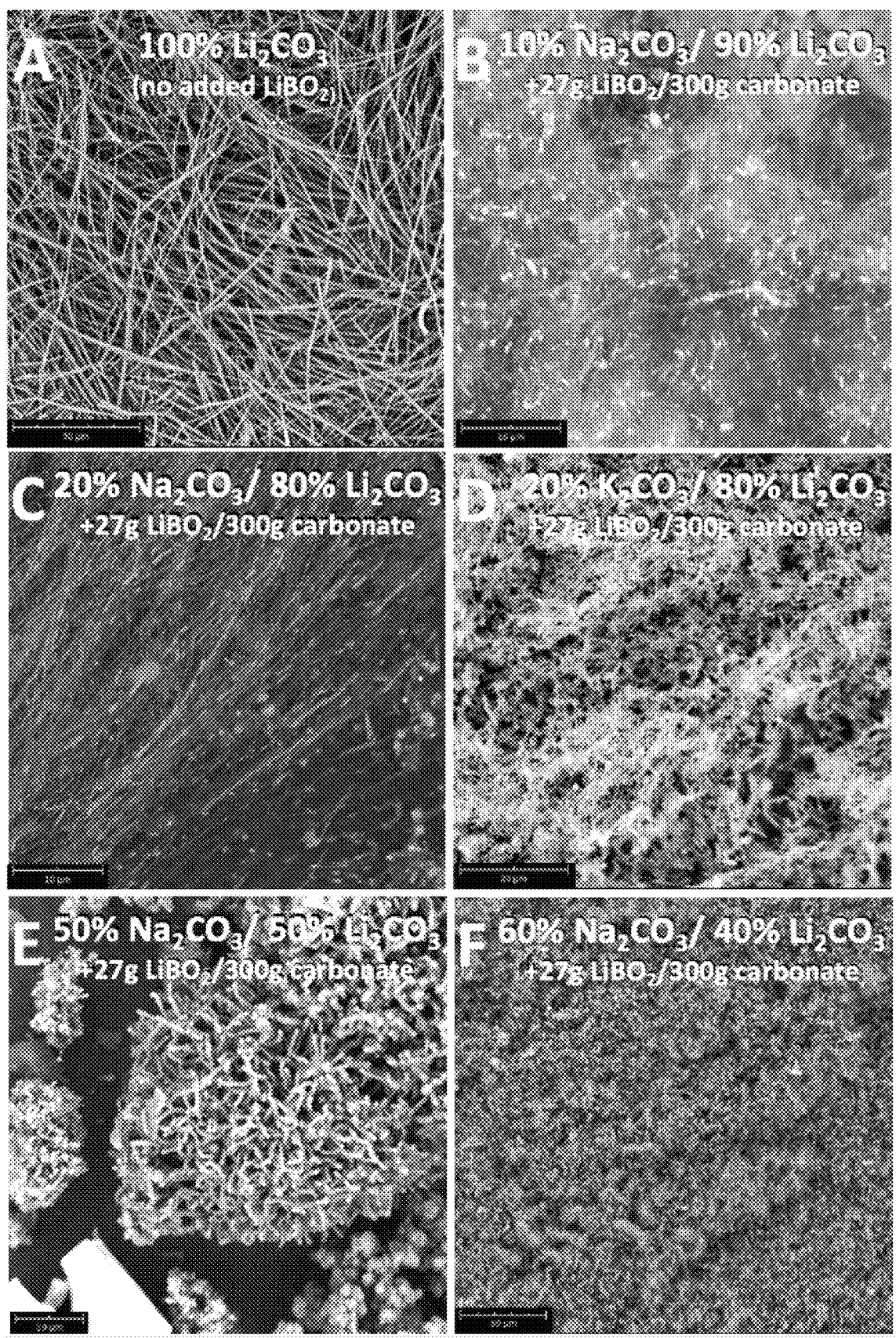
FIG. 9 shows SEM images of an electrolysis product produced in various pure or mixed electrolytes.

It has been shown (see, e.g., Wu et al., *Carbon.*, 2016, 106, 208) that temperatures greater than 700° C. are more conducive to CNT growth during molten carbonate electrolysis. Here, it is also demonstrated that electrolytes with an increasing fraction of $Na_2CO_3$ or $K_2CO_3$ in a mixed $Li_2CO_3$ electrolysis are less conducive to CNT growth even in the presence of nucleating transition metals. FIG. 9 shows SEM of the electrolysis product in various mixed electrolytes compared to that in FIG. 9A conducted in a pure, 24 hour aged, 770° C. $Li_2CO_3$ electrolyte subsequent to a 5 hour electrolysis. Each of the electrolysis reactions was conducted at a current density of 0.2 A/cm² with a cathode of Muntz Brass (an alloy of 60% Cu and 40% Zn) and an anode of Inconel 718 (an alloy of 50-55% Ni, 17-21% Cr, 2, 4.75-5.5% Nb&Ta, 2.8-3.3% Mo, the remainder Fe and low concentrations of Ti, Co, Al, Mn, Cu, Si and C). The addition of 8% $LiBO_2$ to the electrolyte further improves the morphology, uniformity and purity of the carbon nanotube product. For example, addition of 8% $LiBO_2$ to the pure $Li_2CO_3$ increased the aspect ratio (length to diameter) of the CNT product (not shown), and this $LiBO_2$ was added to each of the mixed electrolytes to improve the lower quality of the CNT product. (As discussed below, $H_3BO_3$ can be partially or completed substituted for $LiBO_2$ after water is allowed to leave the system.) The scale bars are 50 μm for FIGS. 9A and 9F, 20 μm for FIG. 9D, and 10 μm for FIGS. 9B, 9C and 9E. As can be seen by comparing FIG. 9A to FIG. 9F at the same scale, there are no CNTs readily observed in the 60% $Na_2CO_3$/40% $Li_2CO_3$ electrolysis product, while the product is highly pure CNTs in the 100% $Li_2CO_3$ electrolysis product. The 10% or 20% $Na_2CO_3$ electrolysis products contain over 90% CNT, while 30% $Na_2CO_3$ (not shown), and 50% $Na_2CO_3$ exhibit a diminishing yield of CNTs and an increasing fraction of carbon nanospheres and carbon platelets. CNT aspect ratio decreases and the diameter increases with increasing $Na_2CO_3$ percentage in the electrolyte (10% $Na_2CO_3$: ~80 nm, 20% % $Na_2CO_3$: ~100 nm, 30% % $Na_2CO_3$: ~200 nm, 50% % $Na_2CO_3$: ~1 m). For the 20 wt % $K_2CO_3$ in $Li_2CO_3$, SEM shown FIG. 9D and 20 wt % $K_2CO_3$ (not shown) electrolyses, the loss of aspect ratio drop in CNT purity occurs more rapidly with increasing $K_2CO_3$ weight fraction than the electrosynthesis with increasing $Na_2CO_3$ fraction. Energy-dispersive X-ray spectroscopy (EDS) tests were employed to probe the elemental analysis of products from the mixed electrolyte electrolyses. EDS of both the 20% $Na_2CO_3$ and 20% $K_2CO_3$ samples are 100% carbon, while the 50% $Na_2CO_3$ and 50% $K_2CO_3$ spectra are respectively 97.0% carbon (and 3.0% Na) and 97.8% carbon (and 2.2% K); boron in the CNTs is below the limits of EDS detection. The calculated thermodynamic potential for the reduction of the alkali carbonates increases in the order $E_{Li2CO3} < E_{Na2CO3} < E_{K2CO3}$. The higher voltage of an increasing concentration of the latter salts would increase the possibility for reduction of the alkali cation to the alkali metal, rather than the desired reduction of carbonate to carbon. The coulombic efficiencies, comparing the mass of the product to the applied 4e⁻ per mole of charge, approach 100% (98-100%) for the three cases of 100% $Li_2CO_3$, 10% $Na_2CO_3$, and 20% $Na_2CO_3$ electrolyte experiments. Coulombic efficiency is still high, but decreased in binary lithium carbon electrolytes containing over 20% of sodium or potassium carbonate. For example, the coulombic electrolysis efficiency drops from 95% for 30% $Na_2CO_3$ electrolyte to 93% 50% $Na_2CO_3$ electrolyte, and to 90% for the 60% $Na_2CO_3$ electrolyte. Carbonate electrolysis is decreasingly conducive to a CNT product in electrolytes containing. >20 wt % $Na_2CO_3$ or >20 wt % $K_2CO_3$.

Figure 10A:
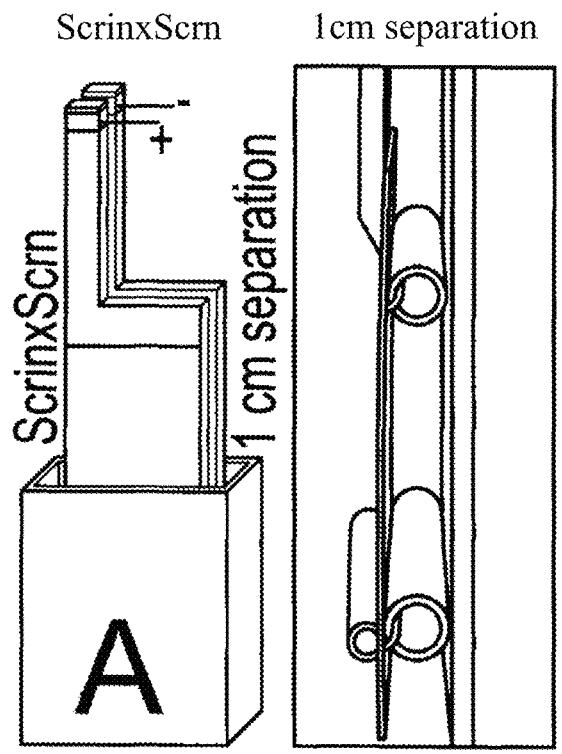
FIG. 10A shows a scheme of an electrolysis cell.
Figure 10B:
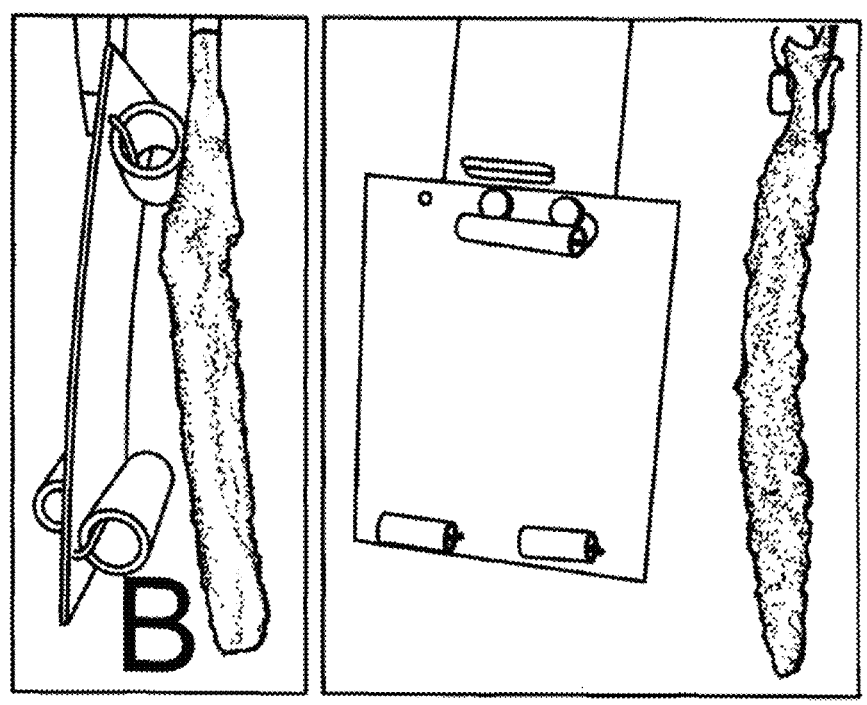
FIG. 10B shows the electrolysis electrodes before and after the electrolysis.
Figure 10:
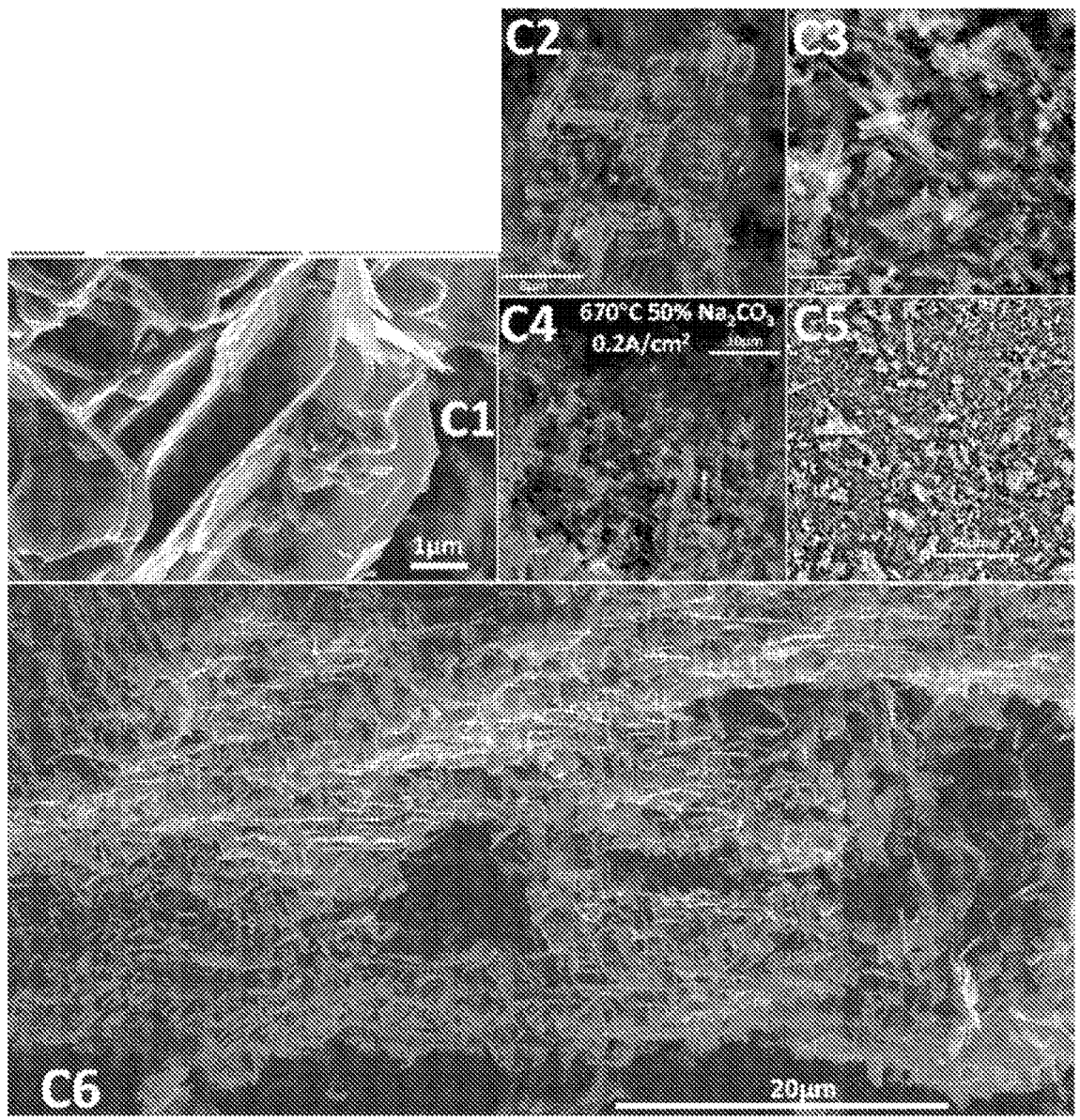
FIG. 10 shows the formation of carbon nano-scaffolds.

In FIG. 10 is shown the distinctive carbon nano-scaffold product when the electrolysis is conducted at 670° C., rather than 770° C., in a similar 50% $Na_2CO_3$/50% $Li_2CO_3$ electrolyte. While transition metal elements can again be release from the Inconel 718 anode, and while the Muntz brass cathode is comprised of copper and zinc, there is no evidence that the carbon nano-scaffold growth is based transition metal nucleation. In the electrolyte 10 wt % $H_3BO_3$, rather than $LiBO_2$, was added as a cost saving measure. $H_3BO_3$ can be partially or completed substituted for $LiBO_2$ after water is allowed to leave the system. A scheme of the electrolysis cell is shown in FIG. 10A, and the electrolysis electrodes before and after the electrolysis in FIG. 10B. SEM images of the product is shown in FIGS. 10 C1-C6 with various magnifications. In total the electrolyte consisted of 250 g of $Na_2CO_3$, 250 g of $Li_2CO_3$, and 50 g of $H_3BO_3$. The electrolysis was conducted at 670° C. for 4.0 hours at a constant current of 5 A with 5 by 5 cm electrodes. Voltage throughout the electrolysis was consistently 2.0 V, and over 85% of theoretically calculated $CO_2$ was converted to carbon. Over 80% of the product was the unusual carbon nano-scaffold morphology. The morphology consists of a series of asymmetric 50 to 200 nm thick flat multilayer graphene platelets 2 to 20 μm long oriented in a 3D neoplasticism-like geometry.

Figure 3:
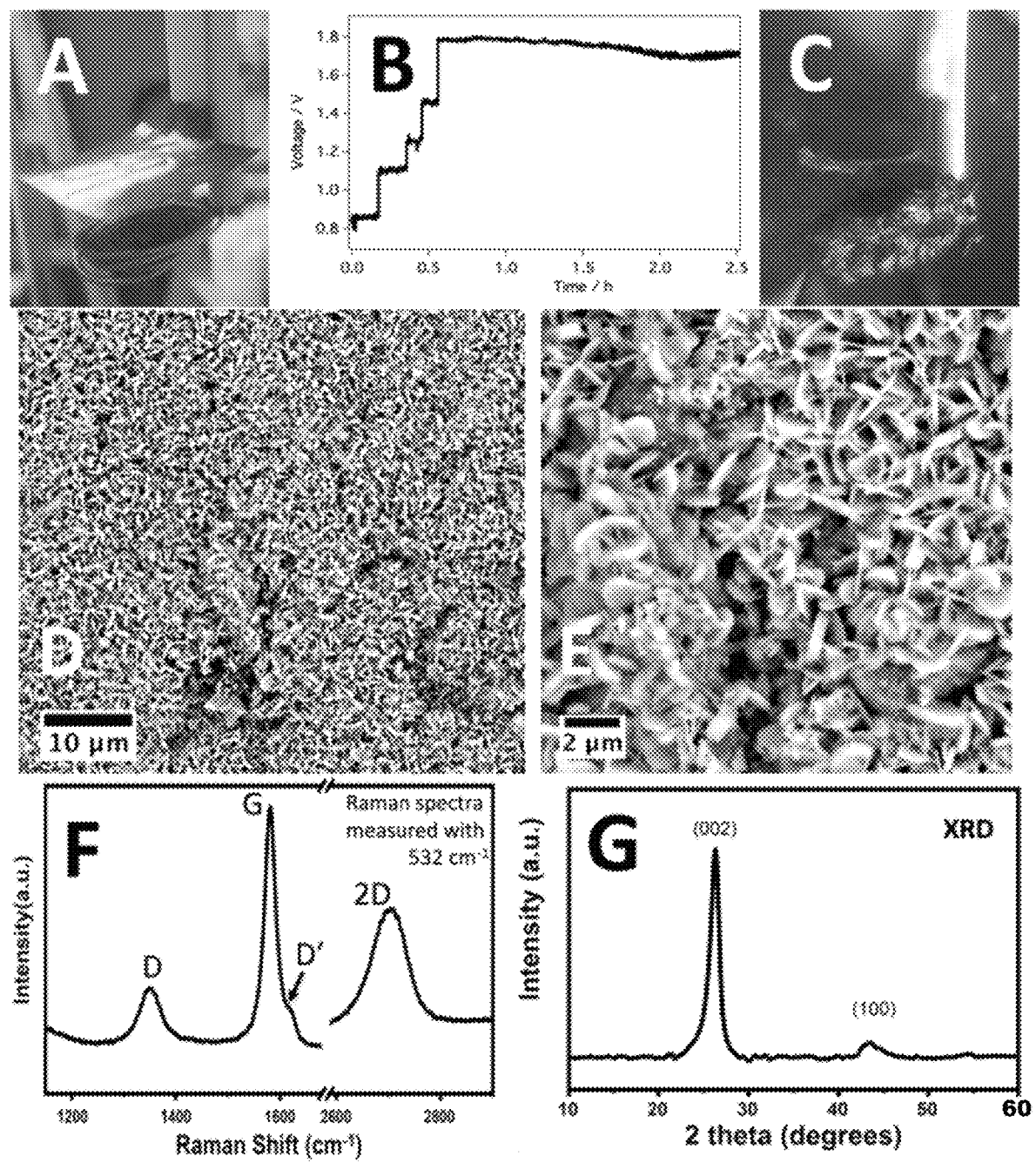
FIG. 3 shows photographs (FIGS. 3A and 3C, electrodes before and after electrolysis, respectively), SEM (FIGS. 3D and 3E), Raman spectroscopy (FIG. 3F) and X-ray diffraction (XRD) (FIG. 3G) of the electrolysis product formed by splitting $CO_2$ in molten carbonate, using a zinc coated stainless steel cathode, illustrating electrosynthesis of carbon platelets from $CO_2$.
Figure 11:
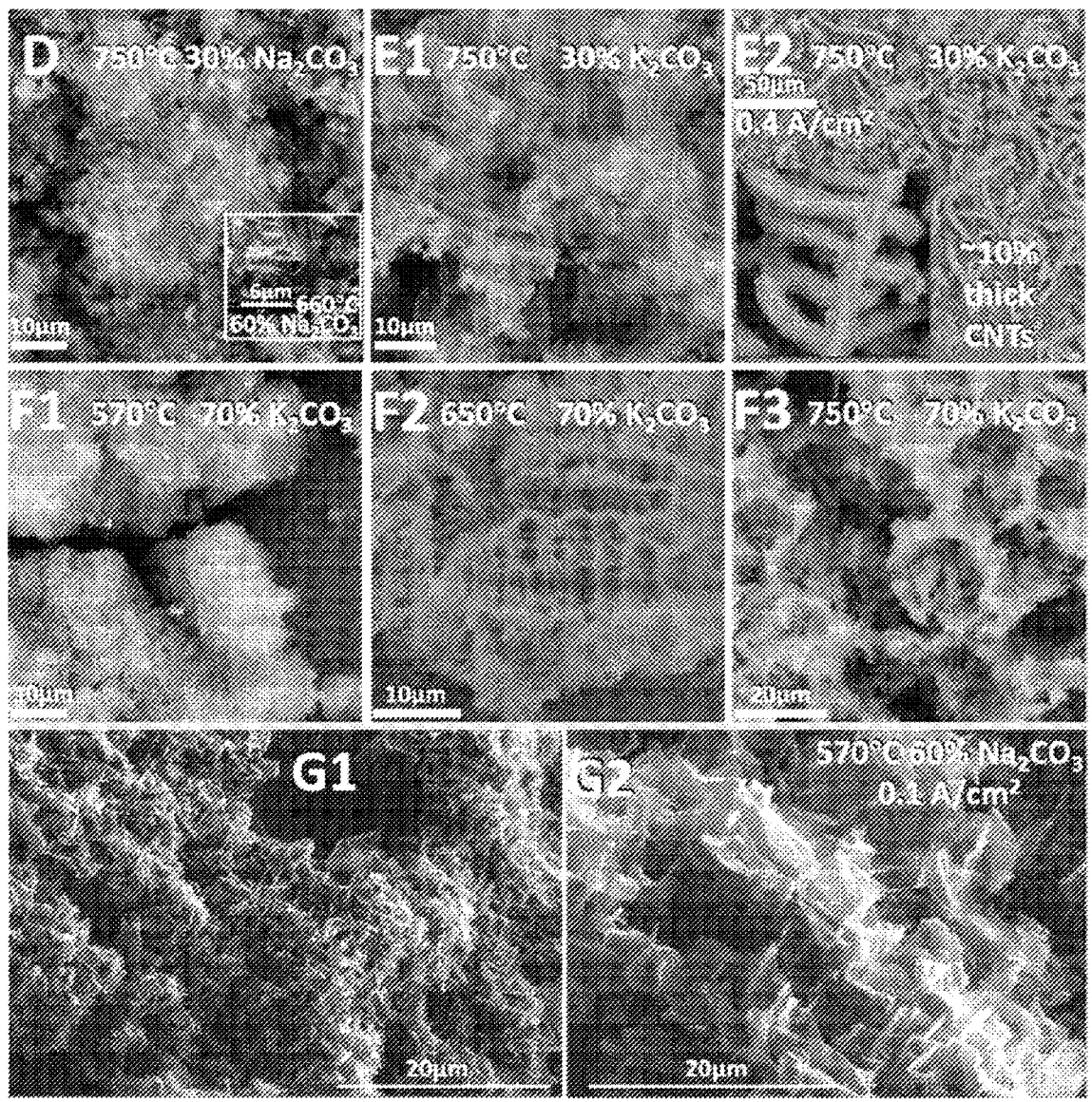
FIG. 11 shows SEM images of the electrolytic product produced under high or low current density conditions in various binary carbonate electrolytes at various temperatures.

FIG. 11 shows SEM of the electrolytic product produced under high (panels D through F) and low (panels) G or current density conditions in various binary carbonate electrolytes at various temperatures. FIGS. 11D-11F show carbon products with a higher current density (0.4 A/cm$^2$), at a range of temperatures, with a different anode, Nichrome C (61% Ni, 15% Cr, 24% Fe, the same cathode, and without any borate additive. As seen in FIGS. 11D and 11E1, there is a significant carbon nano-scaffold product even at the higher temperature of 750° C. At this temperature and current density, the product of the 30% $Na_2CO_3$ electrolysis large proportions of both carbon nano-scaffolds and carbon nano-onions. Not shown is that carbon nano-scaffolds are also observed in a 70 wt % $Na_2CO_3$ electrolyte, but the structures are smaller and are surrounded by amorphous carbon. At this temperature and current density, as seen in FIGS. 11E1 and 11E2, the product of the 30% $K_2CO_3$ electrolysis consists mainly of carbon nano-scaffolds and ~10% very thick carbon nanotubes. EDS verifies that the carbon nano-scaffold structures are largely carbon (98.3%) with a small amount of potassium (1.7%). The carbon nano-scaffold is observed at 50 wt % $K_2CO_3$ (not shown), but as seen in FIGS. 11F1-11F3, carbon nano-scaffolds are not observed in electrolytes with high wt % of $K_2CO_3$ (70% $K_2CO_3$/30% $Li_2CO_3$). In this electrolyte, at 570° C. the F1 panel product consists of small rounded, carbon assemblies, at 650° C. the F2 panel product consists of coral-like carbon assemblies, and at 750° C. the F3 panel product consists of larger, but less defined, coral-like carbon structures. Carbonate electrolysis is conducive to a carbon nano-scaffold product in electrolytes containing 30 to 70 wt % $Na_2CO_3$ or 30 to 50 wt % $K_2CO_3$ at 650° C. or higher (e.g., 750° C. or higher). While transition metal elements can be included in the electrolysis system that produces the nano-scaffold product, there is no evidence that the carbon nano-scaffold growth is based on transition metal nucleation. The inset of panel 11D shows that with the high current density of 0.4 A/cm$^2$ in a 60/40 wt % $Na_2/Li_2CO_3$ electrolyte, the nano-scaffold morphology is still observed when the temperature is decreased to 660° C. Carbon nano-scaffolds can also synthesized at a low current density of 0.1 A/cm$^2$ when the temperature is decreased further to 570° C. as shown in FIG. 11 panel G, although the cross sectional width of each scaffold unit is approximately 3-fold smaller than in FIG. C1-C6 when synthesized at high current density (0.4 A/cm$^2$), higher temperature (670° C.) and with more lithium carbonate (50%) in the electrolyte.

Of course, the above described embodiments are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A method for producing carbon nano-platelets comprising:
   (a) heating a carbonate electrolyte to obtain a molten carbonate electrolyte;
   (b) disposing the molten carbonate electrolyte between an electrolysis anode and an electrolysis cathode in a cell; and
   (c) applying an electrical current to the electrolysis cathode and the electrolysis anode in the cell to electrolyze the carbonate and generate carbon nano-platelets on the electrolysis cathode without the formation of transition metal nucleation sites on the cathode,
   wherein the molten carbonate electrolyte comprises one or more transition metal nucleating agents and the conditions for electrolysis reduce the solubility of one or more of the transition metal nucleating agents.

2. The method of claim 1, wherein the carbonate electrolyte comprises an oxide additive.

3. The method of claim 2, wherein the oxide additive comprises lithium oxide.

4. The method of claim 1, wherein the one or more transition metal nucleating agents for which solubility has been reduced are selected from nickel, chromium, iron, and any combination of any of the foregoing.

5. The method of claim 1, wherein the conditions for reducing the solubility of one or more transition metal nucleating agents during electrolysis include (a) an electrolyte comprising (i) a lithium carbonate and (ii) one or both of sodium carbonate and potassium carbonate, (b) decreasing the electrolysis temperature, (c) decreasing the concentration of lithium in the electrolyte, (d) increasing the electrolysis current density, or (e) any combination of any of the foregoing.

6. The method of claim 1, wherein the electrolyzed carbonate in step (c) is replenished by addition of carbon dioxide.

7. The method of claim 6, wherein the source of the added carbon dioxide is one of air, pressurized $CO_2$, concentrated $CO_2$, a power generating industrial process, an iron generating industrial process, a steel generating industrial process, a cement formation process, an ammonia formation industrial process, an aluminum formation industrial process, a manufacturing process, an oven, a smokestack, or an internal combustion engine.

8. The method of claim 1, wherein the electrolysis cathode comprises stainless steel, cast iron, a nickel alloy, a material that resists corrosion in the presence of the molten carbonate electrolyte, or any combination of the foregoing.

9. The method of claim 1, wherein the electrolysis cathode is coated with zinc.

10. The method of claim 1, wherein in step (c), electrical current is applied with stepwise increases.

11. The method of claim 1, wherein the molten carbonate electrolyte comprises an alkali metal carbonate, an alkali earth metal carbonate, or any combination thereof.

12. The method of claim 11, wherein the alkali metal carbonate or alkali earth metal carbonate is lithium carbonate, sodium carbonate, potassium carbonate, rubidium carbonate, cesium carbonate, francium carbonate, beryllium carbonate, magnesium carbonate, calcium carbonate, strontium carbonate, barium carbonate, radium carbonate, or any mixture thereof.

13. The method of claim 1, wherein the molten carbonate electrolyte comprises lithium carbonate.

14. The method of claim 1, wherein the molten carbonate electrolyte further comprises one or more additional oxygen, sulfur, halide, nitrogen or phosphorous containing inorganic salts.

15. The method of claim 1, wherein the coulombic efficiency in step (c) is greater than about 80%.

16. The method of claim 1, wherein the method results in a coulombic efficiency in step (c) is about 100%.

17. The method of claim 1, wherein the electrolysis reaction is performed at a current density of between about 5 and about 1000 mA $cm^2$.

18. The method of claim 1, wherein step (c) also produces molecular oxygen ($O_2$).

19. The method of claim 1, wherein the method further comprises electrochemically exfoliating the carbon nanoplatelets from a second anode to produce graphene having 1 to 5 layers.

\* \* \* \* \*